(12) United States Patent
Fontaine et al.

(10) Patent No.: US 10,988,488 B2
(45) Date of Patent: Apr. 27, 2021

(54) PROCESS FOR THE FUNCTIONALIZATION OF SP²-H CARBONS USING FRUSTRATED LEWIS PAIR CATALYSTS

(71) Applicant: UNIVERSITE LAVAL, Quebec (CA)

(72) Inventors: Frederic-Georges Fontaine, Quebec (CA); Marc-Andre Legare, Charny (CA); Marc-Andre Courtemanche, Quebec (CA)

(73) Assignee: UNIVERSITÉ LAVAL, Quebec (CA)

( * ) Notice: Subject to any disclaimer, the term of this patent is extended or adjusted under 35 U.S.C. 154(b) by 0 days.

(21) Appl. No.: 15/567,662

(22) PCT Filed: Apr. 21, 2016

(86) PCT No.: PCT/CA2016/000124
§ 371 (c)(1),
(2) Date: Oct. 19, 2017

(87) PCT Pub. No.: WO2016/168914
PCT Pub. Date: Oct. 27, 2016

(65) Prior Publication Data
US 2018/0094001 A1 Apr. 5, 2018

Related U.S. Application Data

(60) Provisional application No. 62/151,647, filed on Apr. 23, 2015.

(51) Int. Cl.
*C07F 5/02* (2006.01)
*B01J 31/14* (2006.01)
*C07B 47/00* (2006.01)
*B01J 31/02* (2006.01)

(52) U.S. Cl.
CPC ........... *C07F 5/027* (2013.01); *B01J 31/0272* (2013.01); *B01J 31/146* (2013.01); *C07B 47/00* (2013.01); *C07F 5/025* (2013.01); *B01J 2231/4277* (2013.01)

(58) Field of Classification Search
CPC ......... C07F 5/027; C07F 5/025; B01J 31/146; B01J 31/0272; B01J 2231/4277; C07B 47/00
USPC ...................................................... 548/405
See application file for complete search history.

(56) References Cited

FOREIGN PATENT DOCUMENTS

WO WO 2008/125911 10/2008
WO WO 2013/177708 12/2013

OTHER PUBLICATIONS

Ackermann, "Carboxylate-assisted transition-metal-catalyzed C-H bond functionalizations: mechanism and scope," *Chem Rev.*, 111(3):1315-1345, 2011.

Baslé et al., "Phosphine-boronates: efficient bifunctional organocatalysts for Michael addition," *Chem. Commun.*, 48:4495-4497, 2012.
Billingsley and Buchwald, "Highly efficient monophosphine-based catalyst for the palladium-catalyzed suzuki-miyaura reaction of heteroaryl halides and heteroaryl boronic acids and esters," *J. Am. Chem. Soc.*, 129(11):3358-3366, 2007.
Chai and Head-Gordon, "Long-range corrected hybrid density functionals with damped atom-atom dispersion corrections," *Phys. Chem. Chem. Phys.*, 10(44):6615-6620, 2008.
Chernichenko et al., "Intramolecular frustrated Lewis pair with the smallest boryl site: reversible H2 addition and kinetic analysis," *Angew. Chem., Int. Ed.*, 54(6):1749-1753, 2015.
Chernichenko et al., "A frustrated-Lewis-pair approach to catalytic reduction of alkynes to cis-alkenes," *Nature Chem.*, 5(8):718-723, 2013.
Cho et al., "Remarkably selective iridium catalysts for the elaboration of aromatic C-H bonds," *Science*, 295(5553):305-308, 2002.
Courtemanche et al., "A highly active phosphine-borane organocatalyst for the reduction of $CO_2$ to methanol using hydroboranes," *J. Am. Chem. Soc.*, 135(25):9326-9329, 2013.
De Meijere and F. Diedrich, Eds., *Metal-Catalyzed Cross-Coupling Reactions*, Wiley-VCH, Weinheim, Ed. 2, 2004.
Declercq et al., "Hydroboration of carbon dioxide using ambiphilic phosphine-borane catalysts: On the role of the formaldehyde adduct," *ACS Catal.*, 5:2513-2520, 2015.
Del Grosso et al., "Pinacol boronates by direct arene borylation with borenium cations," *Angew. Chem., Int. Ed.*, 50(9):2102-2106, 2011.
Del Grosso et al., "Chelate Restrained Boron Cations for Intermolecular Electrophilic Arene Borylation," *Organometallics*, 29(1):241-249, 2010.
Dombray et al., "Iron-catalyzed C-H borylation of arenes," *J. Am. Chem. Soc.*, 137(12):4062-4065, 2015.
Farrell et al., "A family of N-heterocyclic carbine-stabilized borenium ions for metal-free imine hydrogenation catalysis," *Chem. Sci.*, 6:2010-2015, 2015.
Feng et al., "Metal-free asymmetric hydrogenation and hydrosilylation catalyzed by frustrated Lewis pairs," *Tet. Lett.*, 55:6959-6964, 2014.
Francl et al., "Self-consistent molecular orbital methods. XXIII. A polarization-type basis set for second-row elements," *J. Chem. Phys.*, 77:3654-3665, 1982.
Frisch et al., Gaussian 09, Revision C.01, Gaussian, Inc., Wallingford, CT, 2009. Internet. http://www.gaussian.com.
Gómez-Gallego and Sierra, "Kinetic isotope effects in the study of organometallic reaction mechanisms," *Chem. Rev.*, 111(8):4857-4963, 2011.
Gorelsky et al., "Analysis of the concerted metalation-deprotonation mechanism in palladium-catalyzed direct arylation across a broad range of aromatic substrates," *J. Am. Chem. Soc.*, 130(33):10848-10849, 2008.

(Continued)

*Primary Examiner* — Kristin A Vajda
(74) *Attorney, Agent, or Firm* — Lavery, De Billy, LLP; Sarkis Shahinian

(57) ABSTRACT

A catalytic process for the metal-free functionalization of sp²-carbons is described herein. The catalytic process is suitable for forming borylated alkenes, arenes and heteroarenes and comprises the use of catalysts comprising a Frustrated Lewis Pair (FLP).

18 Claims, 3 Drawing Sheets

(56) References Cited

OTHER PUBLICATIONS

Figure 1:
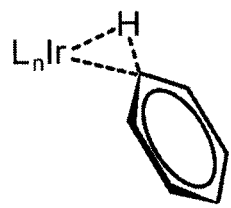
Figure 1:
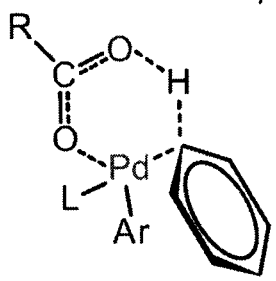
Figure 1:
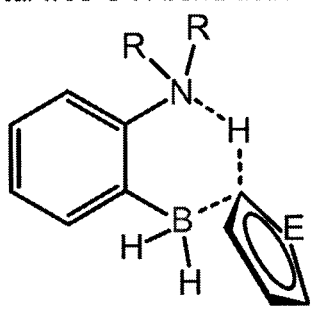

Gorelsky et al., "Analysis of the palladium-catalyzed (aromatic)C-H bond metalation-deprotonation mechanism spanning the entire spectrum of arenes," *J. Org. Chem.*, 77(1):658-668, 2012.
Gorelsky, "Origins of regioselectivity of the palladium-catalyzed (aromatic)CH bond metalation-deprotonation," *Corr. Chem. Rev.*, 257(1):153-164, 2013.
Grimme and Goerigk, "A thorough benchmark of density functional methods for general main group thermochemistry, kinetics, and noncovalent interactions," *Phys. Chem. Chem. Phys.*, 13(14):6670-6688, 2011.
Grimme, "Semiempirical GGA-type density functional constructed with a long-range dispersion correction," *J. Comp. Chem.* 27(15):1787-1799, 2006.
Hall, "1. Structure, Properties, and Preparation of Boronic Acid Derivatives. Overview of Their Reactions and Applications," In: *Boronic Acids: Preparation and Applications in Organic Synthesis, Medicine and Materials*, Dennis G. Hall, Ed., Wiley-VCH, Weinheim, Ed. 2, 2011.
Hatanaka et al., "C-H bond activation/borylation of furans and thiophenes catalyzed by a half-sandwich iron N-heterocyclic carbene complex," *Chem. Asian. J.*, 5(7):1657-1666, 2010.
He et al., "Chain propagation and termination mechanisms for polymerization of conjugated polar alkenes by [Al]-based frustrated Lewis pairs," *Macromol.*, 47:7765-7774, 2014.
Hehre et al., "Self-Consistent Molecular Orbital Methods. XII. Further Extensions of Gaussian-Type Basis Sets for Use in Molecular Orbital Studies of Organic Molecules," *J. Chem. Phys.*, 56:2257-2261, 1972.
Holthausen et al., "Frustrated Lewis pair-mediated C-O or C-H bond activation of ethers," *Chem. Commun.*, 50:10038-10040, 2014.
Ishiyama et al., "Mild iridium-catalyzed borylation of arenes. High turnover numbers, room temperature reactions, and isolation of a potential intermediate," *J. Am. Chem. Soc.*, 124(3):390-391, 2002.
Ji et al., "Experimental and theoretical studies of quadrupolar oligothiophene-cored chromophores containing dimesitylboryl moieties as π-accepting end-groups: syntheses, structures, fluorescence, and one- and two-photon absorption," *Chem. Eur. J.*, 20(42):13618-13635, 2014.
Lafrance and Fagnou, "Palladium-catalyzed benzene arylation: incorporation of catalytic pivalic acid as a proton shuttle and a key element in catalyst design," *J. Am. Chem. Soc.*, 128(51):16496-16497, 2006.
Larsen and Hartwig, "Iridium-catalyzed C-H borylation of heteroarenes: scope, regioselectivity, application to late-stage functionalization, and mechanism," *J. Am. Chem. Soc.*, 136(11):4287-4299, 2014.
Légaré et al., "Metal-free catalytic C-H bon activation and borylation of heterarenes," *Science*, 349(6247):513-516, 2015.
Légaré, "Cooperative reactivity of boron-containing molecules and Lewis bases for metal free catalysis," Thesis, Université Laval, 2015.
Marenich et al., "Universal solvation model based on solute electron density and on a continuum model of the solvent defined by the bulk dielectric constant and atomic surface tensions," *J. Phys. Chem. B*, 113(18):6378-6396, 2009.
Mazzacano and Mankad, "Base metal catalysts for photochemical C-H borylation that utilize metal-metal cooperativity," *J. Am. Chem. Soc.*, 135(46):17258-17261, 2013.
Miyaura and Suzuki, "Palladium-Catalyzed Cross-Coupling Reactions of Organoboron Compounds," *Chem. Rev.*, 95(7):2457-2483, 1995.
Mkhalid et al., "C-H Activation for the Construction of C-B Bonds," *Chem. Rev.*, 110:890-931, 2010.
Mömming et al., "Reactions of an intramolecular frustrated Lewis pair with unsaturated substrates: Evidence for a concerted olefin addition reaction," *J. Am. Chem. Soc.*, 131:12280-12289, 2009.
PCT International Search Report and Written Opinion issued in International Application No. PCT/CA2016/000124, dated Jul. 20, 2016.
Rousseaux et al., In: *Modern Tools for the Synthesis of Complex Bioactive Molecules*, J. Cossy and S. Arseniyadis, Eds., Wiley, Hoboken, Chap. 1., 2012.
Smith et al., "Palladium catalysed aryl amination reactions in supercritical carbon dioxide," *Org. Biomol. Chem.*, 3(20):3767-3781, 2005.
Stephan et al., "Frustrated Lewis pairs: Metal-free hydrogen activation and more," *Agnew. Chem. Int. Ed.*, 49:46-76, 2010.
Stephan, ""Frustrated Lewis pair" hydrogenations," *Org. Biomol. Chem.*, 10(30):5740-5746, 2012.
Stephan, "Frustrated Lewis pairs," *J. Am Chem. Soc.*, 137:10018-10032, 2015.
Usluer et al., "Metal Residues in Semiconducting Polymers: Impact on the Performance of Organic Electronic Devices," *ACS Macro Lett.*, 3, 1134-1138, 2014.
Villarreal and Martínez, "Synthesis of Novel Furo-, Thieno-, and Pyrroloazepines," *Synthesis*, 19:3346-3352, 2010.
Welch et al., "Reversible, metal-free hydrogen activation," *Science*, 314(5802):1124-1126, 2006.
Wencel-Delord and Glorius, "C-H bond activation enables the rapid construction and late-stage diversification of functional molecules," *Nature Chem.*, 5(5), 369-375, 2013.
Zulauf et al., "Chromium-Thiophene-salen-Based Polymers for Heterogeneous Asymmetric Hetero-Diels—Alder Reactions," *Eur. J. Org. Chem.*, 2008(12):2118-2129, 2008.
Extended European Search Report issued in European Patent Application No. 16782411.9, dated Mar. 28, 2019.
Preshlock et al., "A traceless directing group for C-H Borylation," *Angew. Chem. Int.*, 52(49):12915-12929, 2003.
Ros et al., "Functional group directed C-H borylation," *Chem. Soc. Rev.*, 43:3229-3243, 2014.
Tomita et al., "Enantioselective synthesis of SM-130686 based on the development of asymmetric Cu(I)F catalysis to access 2-oxindoles containing a tetrasubstituted carbon," *J. Am. Chem. Soc.*, 131:6946-6948, 2009
Whited, "Metal-ligand multiple bonds as frustrated Lewis pairs for C-H functionalization," *Beilstein J. Org. Chem.*, 8:1554-1563, 2012.

A) *Classical oxidative addition*

B) *Concerted metalation deprotonation*

C) *Metal-free C-H bond activation*

E=O,S,N-R

PROCESS FOR THE FUNCTIONALIZATION OF SP²-H CARBONS USING FRUSTRATED LEWIS PAIR CATALYSTS

CROSS-REFERENCE TO RELATED APPLICATIONS

The present application is a national phase application under 35 U.S.C. § 371 of International Application No. PCT/CA2016/000124 filed on Apr. 21, 2016, which claims the benefit of priority from U.S. Provisional Application No. 62/151,647 filed on Apr. 23, 2015, the contents of each of which are incorporated herein by reference in their entirety.

FIELD

The present disclosure broadly relates to a catalytic process for the metal-free functionalization of sp²-carbons. More specifically, but not exclusively, the present disclosure relates to metal-free catalytic processes for forming functionalized alkenes, arenes and heteroarenes. The present disclosure also relates to catalysts for the metal-free borylation of sp² carbons.

BACKGROUND

Transition-metal catalyzed reactions are nowadays ubiquitous tools in the pharmaceutical and agrochemical industries. Indeed, many transition metal complexes are efficient catalysts for the C—H bond functionalization of heteroarenes to generate useful products for the pharmaceutical and agricultural industries. However, the need to remove potentially toxic trace metals from the end products is costly and prohibitive. Moreover, trace metals in products for human consumption are heavily regulated by international instances.

Similar concerns have been noted in the modern electronic industry where metals need to be removed from organic electronic devices to avoid loss of efficiency.[1] Nevertheless, the importance of selectively forming bonds between carbon and other elements using transition metals has been acknowledged by three Nobel Prizes in Chemistry in the past 15 years, including one in 2010 for the discovery of the cross-coupling reaction. This widely used reaction generates bonds between carbon, usually sp²-hybridized ($C_{sp2}$), and other elements.[2]

The catalytic functionalization of C—H bonds using transition metals has had a significant impact on synthetic chemistry as a green and atom economical way to generate new bonds without the need of activated precursors.[3-4] The catalytic $C_{sp2}$—H borylation of aromatic molecules uses such an activation process to generate organoboranes,[5-7] species of importance in both the pharmaceutical industry as well as in modern organic materials.[8] In addition, organoboranes are building blocks for the creation of new C—C bonds such as in the Suzuki-Miyaura cross-coupling reaction.[9] Although some base metal complexes have been used as catalysts for the borylation of arenes under photocatalytic conditions[10-11] and the borenium species generated in situ by highly reactive precursors in presence of basic additives[12-13] can borylate arenes, the most efficient systems to date rely on expensive metals, most notably iridium.[6,7]

Noble metals are well suited to cleave aromatic C—H bonds since they can easily perform two-electron transfer processes. In this often rate-limiting transition state, two electrons from one metal orbital can be transferred in the anti-bonding orbital of the C—H bond with simultaneous transfer of the electrons of the C—H bond to an empty orbital on the metal center (FIG. 1A).[14] A recent alternative is the direct arylation through palladium carboxylate complexes where the electron transfer is facilitated by the basic carboxylate group abstracting the proton on the aromatic molecule while the aryl group coordinates the metallic centre (FIG. 1B).[15-16]

The metal-free activation of hydrogen using the concept of "Frustrated Lewis Pairs" (FLPs),[17-18] led to an important breakthrough in the metal-free hydrogenation reaction.[19] In this process, cleavage of $H_2$ occurs during the transition state via the cooperation of a Lewis acid and a Lewis base that are prevented to form a Lewis pair by steric or geometry constraints. Adapting this concept for the cleavage of $C_{sp2}$—H bonds would make 2-electron transfer processes accessible for FLP chemistry: a Lewis base could abstract a proton while the electron density of the $C_{sp2}$—H would be transferred to a Lewis acid (FIG. 1C). Such a process would be similar to the transformations observed with palladium carboxylate complexes.

The present disclosure refers to a number of documents, the contents of which are herein incorporated by reference in their entirety.

SUMMARY

In an aspect, the present disclosure broadly relates to a catalytic process for the metal-free functionalization of sp²-carbons. In a further aspect, the present disclosure broadly relates to metal-free catalytic processes for forming functionalized alkenes, arenes and heteroarenes.

The present disclosure, in an aspect, relates to a catalytic process for the metal-free borylation of sp²-carbons. In a further aspect, the present disclosure broadly relates to metal-free catalytic processes for forming borylated alkenes, arenes and heteroarenes. In yet a further aspect, the present disclosure broadly relates to catalysts for the metal-free borylation of sp² carbons.

The present disclosure, in an aspect, relates to a catalytic process for effecting $C_{sp2}$—H bond cleavage. In an embodiment, the $C_{sp2}$—H bond cleavage is effected using catalysts comprising a Frustrated Lewis Pair (FLP). In a further embodiment, the catalysts are used in metal-free processes effecting $C_{sp2}$—H bond cleavage.

The present disclosure, in an aspect, relates to the catalytic dehydrogenative borylation of alkenes, arenes and heteroarenes. In an embodiment of the present disclosure, catalysts for the dehydrogenative borylation of sp² carbons include intramolecular FLPs.

The present disclosure, in one embodiment includes contacting a catalytic reagent comprising at least one intramolecular Frustrated Lewis Pair, a suitable reagent, and a substrate comprising a $C_{sp2}$—H bond, under conditions to provide a substrate comprising a functionalized sp² carbon.

The present disclosure, in one embodiment includes contacting a catalytic reagent comprising at least one intramolecular Frustrated Lewis Pair, an organoborane reagent; and a substrate comprising a $C_{sp2}$—H bond, under conditions to provide a substrate comprising a borylated sp² carbon.

In an embodiment, the present disclosure includes a catalytic process for the functionalization of a sp² carbon, the process comprising:

contacting a compound comprising a Frustrated Lewis Pair, a functionalization reagent; and a substrate comprising a sp²-H carbon;

under conditions to provide a substrate comprising a functionalized sp² carbon.

In an embodiment, the present disclosure relates to a catalytic process for the functionalization of a sp² carbon, the process comprising:

contacting a compound of Formula I:

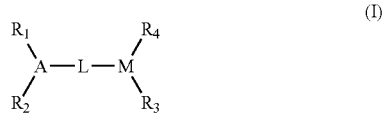

wherein:

A is N; P; S; O or a carbene; with the proviso that when A is S, O or carbene, $R_2$ is absent;

M is B, Al, Ga, In, C⁺, Si($R_5$), Si($R_5$)($R_5$), Si($R_5$)($R_5$)($R_5$), P($R_5$);

$R_1$ and $R_2$ are independently hydrogen, $C_{1-15}$alkyl, $C_{4-15}$branched alkyl, $C_{6-18}$aryl, $C_{6-18}$aryl having at least one $C_{1-10}$alkyl substituent, $C_{5-8}$cycloalkyl; $C_{5-8}$cycloalkyl having at least one $C_{1-10}$alkyl substituent; or $R_1$ and $R_2$ are linked together to form a nitrogen or phosphorus containing ring system, wherein the nitrogen or phosphorus containing ring system may further comprise at least one heteroatom selected from nitrogen, oxygen and sulfur, and wherein the nitrogen or phosphorus containing ring system is optionally substituted by one or more $C_{1-10}$alkyl groups;

$R_3$ and $R_4$ are independently hydrogen, halogen, $C_{1-15}$alkyl, $C_{4-15}$branched alkyl, $C_{6-18}$aryl, $C_{6-18}$aryl having at least one substituent chosen from halogen and $C_{1-10}$alkyl, $C_{5-8}$cycloalkyl; $C_{5-8}$cycloalkyl having at least one $C_{1-10}$alkyl substituent, $OR_6$; or $R_3$ and $R_4$ are linked together to form a boron, aluminum, gallium, indium, silicon or phosphorus containing ring system, wherein the boron, aluminum, gallium, indium, silicon or phosphorus containing ring system may further comprise at least one heteroatom selected from nitrogen, oxygen and sulfur, and wherein the boron, aluminum, gallium, indium, silicon or phosphorus containing ring system is optionally substituted by one or more $C_{1-10}$alkyl groups;

$R_5$ is hydrogen, $C_{1-15}$alkyl, $OR_6$, and halogen;

$R_6$ is $C_{1-15}$alkyl;

L is a heteroarene, arene, or a carbon chain ($C_1$ trough $C_{20}$) which can be linear, cyclic or branched and may comprise heteroatoms, with the proviso that A and M are in a vicinal position relative to each other; or L is a polymer comprising monomeric repeating units having an aryl group, with the proviso that A and M are in a vicinal position relative to each other on the aryl groups;

a functionalization reagent; and a substrate comprising a sp²-H carbon;

under conditions to provide a substrate comprising a functionalized sp² carbon.

In an embodiment, the present disclosure relates to a catalytic process for the functionalization of a sp² carbon, the process comprising:

contacting a compound of Formula I:

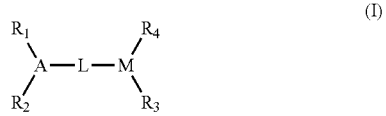

wherein:

A is N; P; S; or O; with the proviso that when A is S or O, $R_2$ is absent;

M is B, Al, Ga or In;

$R_1$ and $R_2$ are independently hydrogen, $C_{1-15}$alkyl, $C_{4-15}$branched alkyl, $C_{6-18}$aryl, $C_{6-18}$aryl having at least one $C_{1-10}$alkyl substituent, $C_{5-8}$cycloalkyl; $C_{5-8}$cycloalkyl having at least one $C_{1-10}$alkyl substituent; or $R_1$ and $R_2$ are linked together to form a nitrogen or phosphorus containing ring system, wherein the nitrogen or phosphorus containing ring system may further comprise at least one heteroatom selected from nitrogen, oxygen and sulfur, and wherein the nitrogen or phosphorus containing ring system is optionally substituted by one or more $C_{1-10}$alkyl groups;

$R_3$ and $R_4$ are independently hydrogen, halogen, $C_{1-15}$alkyl, $C_{4-15}$branched alkyl, $C_{6-18}$aryl, $C_{6-18}$aryl having at least one substituent chosen from halogen and $C_{1-10}$alkyl, $C_{5-8}$cycloalkyl; $C_{5-8}$cycloalkyl having at least one $C_{1-10}$alkyl substituent; or $R_3$ and $R_4$ are linked together to form a boron, aluminum, gallium or indium containing ring system, wherein the boron, aluminum, gallium or indium containing ring system may further comprise at least one heteroatom selected from nitrogen, oxygen and sulfur, and wherein the boron, aluminum, gallium or indium containing ring system is optionally substituted by one or more $C_{1-10}$alkyl groups;

L is a heteroarene, arene, or a carbon chain ($C_1$ trough $C_{20}$) which can be linear, cyclic or branched and may comprise heteroatoms, with the proviso that A and M are in a vicinal position relative to each other; or L is a polymer comprising monomeric repeating units having an aryl group, with the proviso that A and M are in a vicinal position relative to each other on the aryl groups;

a functionalization reagent; and a substrate comprising a sp²-H carbon;

under conditions to provide a substrate comprising a functionalized sp² carbon.

In an embodiment, the present disclosure relates to a catalytic process for the dehydrogenative functionalization of a sp² carbon, the process comprising:

contacting a compound of Formula I:

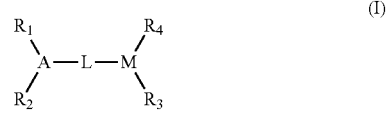

wherein:

A is N; P; S; O or a carbene; with the proviso that when A is S, O or carbene, $R_2$ is absent;

M is B, Al, Ga, In, C⁺, Si($R_5$), Si($R_5$)($R_5$), Si($R_5$)($R_5$)($R_5$), P($R_5$);

$R_1$ and $R_2$ are independently hydrogen, $C_{1-15}$alkyl, $C_{4-15}$branched alkyl, $C_{6-18}$aryl, $C_{6-18}$aryl having at least one $C_{1-10}$alkyl substituent, $C_{5-8}$cycloalkyl; $C_{5-8}$ cycloalkyl having at least one $C_{1-10}$alkyl substituent; or $R_1$ and $R_2$ are linked together to form a nitrogen or phosphorus containing ring system, wherein the nitrogen or phosphorus containing ring system may further comprise at least one heteroatom selected from nitrogen, oxygen and sulfur, wherein the nitrogen or phosphorus containing ring system is optionally substituted by one or more $C_{1-10}$alkyl groups;

$R_3$ and $R_4$ are independently hydrogen, halogen, $C_{1-15}$alkyl, $C_{4-15}$branched alkyl, $C_{6-18}$aryl, $C_{6-18}$aryl having at least one substituent chosen from halogen and $C_{1-10}$alkyl, $C_{5-8}$cycloalkyl; $C_{5-8}$cycloalkyl having at least one $C_{1-10}$alkyl substituent, $OR_6$; or $R_3$ and $R_4$ are linked together to form a boron, aluminum, gallium, indium, silicon or phosphorus containing ring system, wherein the boron, aluminum, gallium, indium, silicon or phosphorus containing ring system may further comprise at least one heteroatom selected from nitrogen, oxygen and sulfur, wherein the boron, aluminum, gallium, indium, silicon or phosphorus containing ring system is optionally substituted by one or more $C_{1-10}$alkyl groups;

$R_5$ is hydrogen, $C_{1-15}$alkyl, $OR_6$, and halogen;

$R_6$ is $C_{1-15}$alkyl;

L is a heteroarene, arene, or a carbon chain ($C_1$ trough $C_{20}$) which can be linear, cyclic or branched and may comprise heteroatoms, with the proviso that A and M are in a vicinal position relative to each other; or L is a polymer comprising monomeric repeating units having an aryl group, with the proviso that A and M are in a vicinal position relative to each other on the aryl groups;

a functionalization reagent; and a substrate comprising a $sp^2$-H carbon;

under conditions to provide a substrate comprising a functionalized $sp^2$ carbon.

In an embodiment, the present disclosure relates to a catalytic process for the dehydrogenative functionalization of a $sp^2$ carbon, the process comprising:

contacting a compound of Formula I:

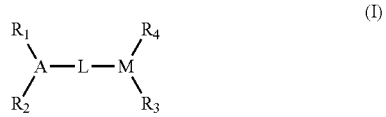

wherein:

A is: N; P; S; or O; with the proviso that when A is S or O, $R_2$ is absent;

M is B, Al, Ga or In;

$R_1$ and $R_2$ are independently hydrogen, $C_{1-15}$alkyl, $C_{4-15}$branched alkyl, $C_{6-18}$aryl, $C_{6-18}$aryl having at least one $C_{1-10}$alkyl substituent, $C_{5-8}$cycloalkyl; $C_{5-8}$cycloalkyl having at least one $C_{1-10}$alkyl substituent; or $R_1$ and $R_2$ are linked together to form a nitrogen or phosphorus containing ring system, wherein the nitrogen or phosphorus containing ring system may further comprise at least one heteroatom selected from nitrogen, oxygen and sulfur, wherein the nitrogen or phosphorus containing ring system is optionally substituted by one or more $C_{1-10}$alkyl groups;

$R_3$ and $R_4$ are independently hydrogen, halogen, $C_{1-15}$alkyl, $C_{4-15}$branched alkyl, $C_{6-18}$aryl, $C_{6-18}$aryl having at least one substituent chosen from halogen and $C_{1-10}$alkyl, $C_{5-8}$cycloalkyl; $C_{5-8}$cycloalkyl having at least one $C_{1-10}$alkyl substituent; or $R_3$ and $R_4$ are linked together to form a boron, aluminum, gallium or indium containing ring system, wherein the boron, aluminum, gallium or indium containing ring system may further comprise at least one heteroatom selected from nitrogen, oxygen and sulfur, wherein the boron, aluminum, gallium or indium containing ring system is optionally substituted by one or more $C_{1-10}$alkyl groups;

L is a heteroarene, arene, or a carbon chain ($C_1$ trough $C_{20}$) which can be linear, cyclic or branched and may comprise heteroatoms, with the proviso that A and M are in a vicinal position relative to each other; or L is a polymer comprising monomeric repeating units having an aryl group, with the proviso that A and M are in a vicinal position relative to each other on the aryl groups;

a functionalization reagent; and a substrate comprising a $sp^2$-H carbon;

under conditions to provide a substrate comprising a functionalized $sp^2$ carbon.

In an embodiment, the present disclosure relates to a catalytic process for the functionalization of a $sp^2$ carbon, the process comprising:

contacting a compound of Formula I:

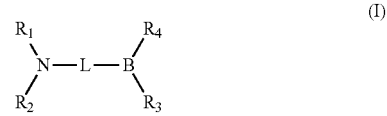

wherein:

$R_1$ and $R_2$ are independently hydrogen, $C_{1-15}$alkyl, $C_{4-15}$branched alkyl, $C_{6-18}$aryl, $C_{6-18}$aryl having at least one $C_{1-10}$alkyl substituent, $C_{5-8}$cycloalkyl; $C_{5-8}$cycloalkyl having at least one $C_{1-10}$alkyl substituent; or $R_1$ and $R_2$ are linked together to form a nitrogen containing ring system, wherein the nitrogen containing ring system may further comprise at least one heteroatom selected from nitrogen, oxygen and sulfur, and wherein the nitrogen containing ring system is optionally substituted by one or more $C_{1-10}$alkyl groups;

$R_3$ and $R_4$ are independently hydrogen, halogen, $C_{1-15}$alkyl, $C_{4-15}$branched alkyl, $C_{6-18}$aryl, $C_{6-18}$aryl having at least one substituent chosen from halogen and $C_{1-10}$alkyl, $C_{5-8}$cycloalkyl; $C_{5-8}$cycloalkyl having at least one $C_{1-10}$alkyl substituent; or $R_3$ and $R_4$ are linked together to form a boron containing ring system, wherein the boron containing ring system may further comprise at least one heteroatom selected from nitrogen, oxygen and sulfur, and wherein the boron containing ring system is optionally substituted by one or more $C_{1-10}$alkyl groups;

L is a heteroarene, arene, or a carbon chain ($C_1$ trough $C_{20}$) which can be linear, cyclic or branched and may comprise heteroatoms, with the proviso that A and M are in a vicinal position relative to each other; or L is a polymer comprising monomeric repeating units having an aryl group, with the proviso that A and M are in a vicinal position relative to each other on the aryl groups;

a functionalization reagent; and a substrate comprising a $sp^2$-H carbon;

under conditions to provide a substrate comprising a functionalized $sp^2$ carbon.

In an embodiment, the present disclosure relates to a catalytic process for the dehydrogenative functionalization of a $sp^2$ carbon, the process comprising:

contacting a compound of Formula I:

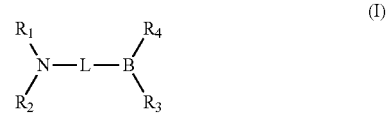

wherein:

$R_1$ and $R_2$ are independently hydrogen, $C_{1-15}$alkyl, $C_{4-15}$branched alkyl, $C_{6-18}$aryl, $C_{6-18}$aryl having at least one $C_{1-10}$alkyl substituent, $C_{5-8}$cycloalkyl; $C_{5-8}$cycloalkyl having at least one $C_{1-10}$alkyl substituent; or $R_1$ and $R_2$ are linked together to form a nitrogen containing ring system, wherein the nitrogen containing ring system may further comprise at least one heteroatom selected from nitrogen, oxygen and sulfur, and wherein the nitrogen containing ring system is optionally substituted by one or more $C_{1-10}$alkyl groups;

$R_3$ and $R_4$ are independently hydrogen, halogen, $C_{1-15}$alkyl, $C_{4-15}$branched alkyl, $C_{6-18}$aryl, $C_{6-18}$aryl having at least one substituent chosen from halogen and $C_{1-10}$alkyl, $C_{5-8}$cycloalkyl; $C_{5-8}$cycloalkyl having at least one $C_{1-10}$alkyl substituent, or $R_3$ and $R_4$ are linked together to form a boron containing ring system, wherein the boron containing ring system may further comprise at least one heteroatom selected from nitrogen, oxygen and sulfur, and wherein the boron containing ring system is optionally substituted by one or more $C_{1-10}$alkyl groups;

L is a heteroarene, arene, or a carbon chain ($C_1$ trough $C_{20}$) which can be linear, cyclic or branched and may comprise heteroatoms, with the proviso that A and M are in a vicinal position relative to each other; or L is a polymer comprising monomeric repeating units having an aryl group, with the proviso that A and M are in a vicinal position relative to each other on the aryl groups;

a functionalization reagent; and a substrate comprising a $sp^2$-H carbon;

under conditions to provide a substrate comprising a functionalized $sp^2$ carbon.

In an embodiment of the present disclosure, the catalytic process for the functionalization of a $sp^2$ carbon or for the dehydrogenative functionalization of a $sp^2$ carbon comprises the use of a compound having the formula:

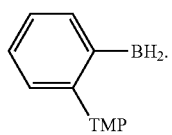

TMP

In an embodiment of the present disclosure, the catalytic process for the functionalization of a $sp^2$ carbon is characterized by the absence of metal based or organometallic reagents.

In an embodiment of the present disclosure, the catalytic process for the functionalization of a $sp^2$ carbon is characterized by a catalyst of Formula I being present from about 1 mol % to about 10 mol %.

The foregoing and other advantages and features of the present disclosure will become more apparent upon reading of the following non-restrictive description of illustrative embodiments thereof, given by way of example only with reference to the accompanying drawings/figures.

BRIEF DESCRIPTION OF THE DRAWINGS/FIGURES

In the appended drawings/figures:

FIG. 1 illustrates representative transition states for various C—H activation systems: A) Oxidative addition at Iridium(I) ($L_n$Ir); B) Carboxylate-assisted metalation deprotonation palladium catalysts; and C) Metal-free C—H activation of heteroarenes using FLP organocatalysts. The dashed lines represent bonds formed and cleaved during the electron transfer.

Figure 2:
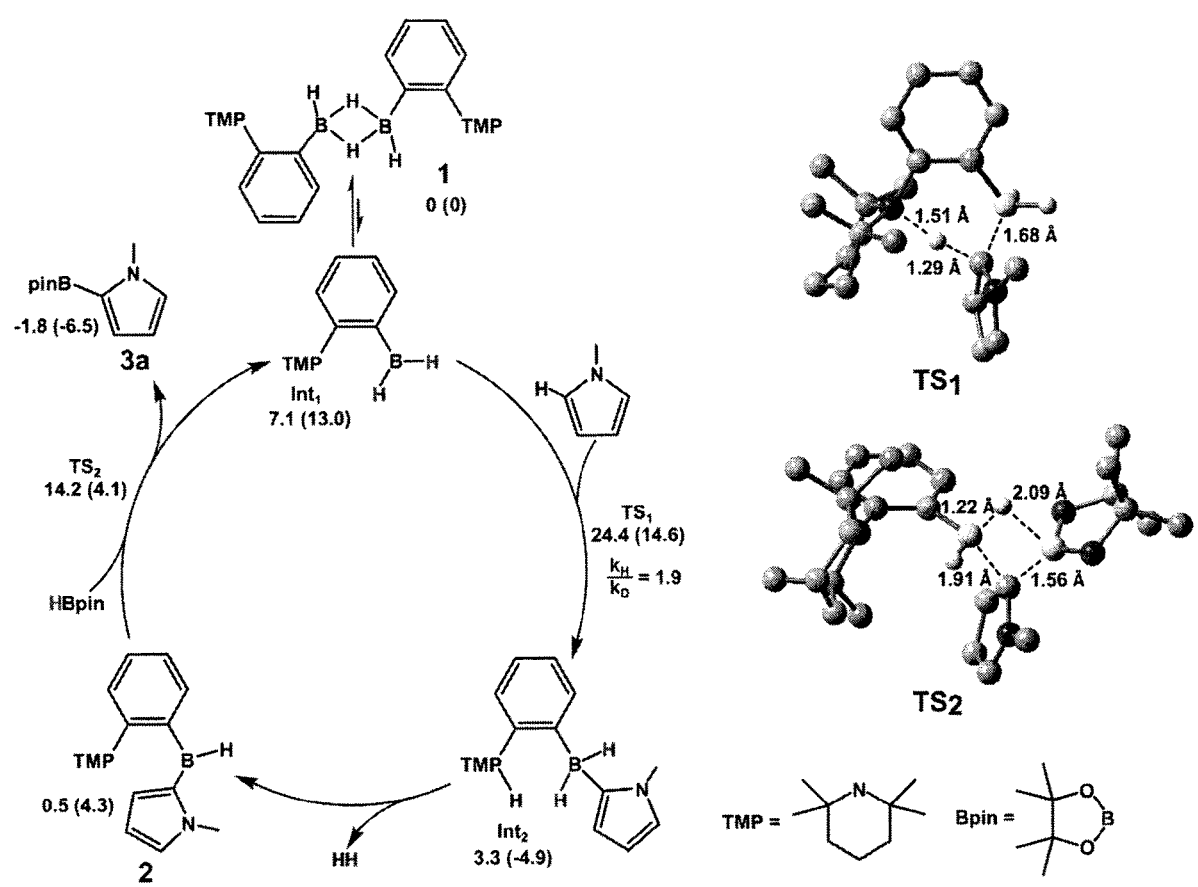

FIG. 2 is an illustration of the theoretical mechanistic pathway for the catalytic cycle of the borylation of N-methylpyrrole using catalyst 1. The formation of 2 from 1 (KIE of 1.8 when carried using 1-methylpyrrole-$d_4$) and 3a from 2 were observed using NMR spectroscopy, with an overall KIE of 1.9 for the catalytic transformation. Int1 and Int2 were not observed and transition states TS1 and TS2 are represented.

Figure 3:
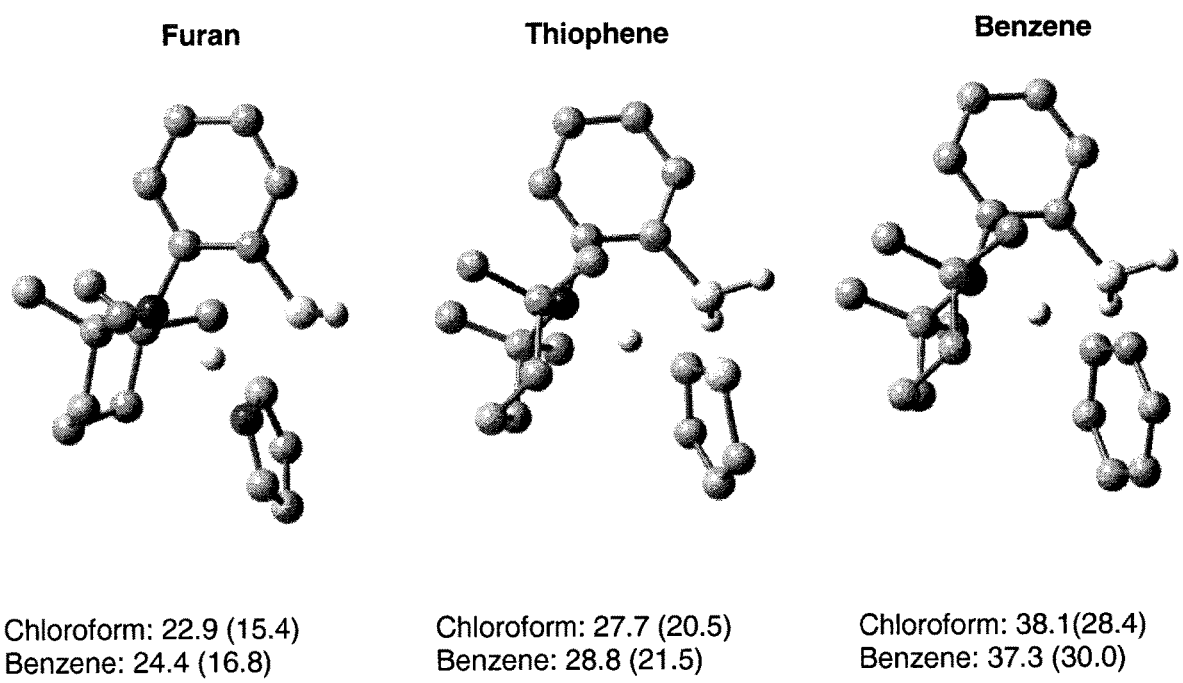

FIG. 3 is an illustration of the calculated C—H activation barriers for furan, thiophene and benzene substrates using catalyst 1.

DETAILED DESCRIPTION

Glossary

In order to provide a clear and consistent understanding of the terms used in the present disclosure, a number of definitions are provided below. Moreover, unless defined otherwise, all technical and scientific terms as used herein have the same meaning as commonly understood by one of ordinary skill in the art to which this disclosure pertains.

The word "a" or "an" when used in conjunction with the term "comprising" in the claims and/or the disclosure may mean "one", but it is also consistent with the meaning of "one or more", "at least one", and "one or more than one" unless the content clearly dictates otherwise. Similarly, the word "another" may mean at least a second or more unless the content clearly dictates otherwise.

As used in this disclosure and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

As used in this disclosure and claim(s), the word "consisting" and its derivatives, are intended to be close ended terms that specify the presence of stated features, elements, components, groups, integers, and/or steps, and also exclude the presence of other unstated features, elements, components, groups, integers and/or steps.

The term "consisting essentially of", as used herein, is intended to specify the presence of the stated features, elements, components, groups, integers, and/or steps as well as those that do not materially affect the basic and novel characteristic(s) of these features, elements, components, groups, integers, and/or steps.

The terms "about", "substantially" and "approximately" as used herein mean a reasonable amount of deviation of the modified term such that the end result is not significantly changed. These terms of degree should be construed as including a deviation of at least ±1% of the modified term if this deviation would not negate the meaning of the word it modifies.

The present description refers to a number of chemical terms and abbreviations used by those skilled in the art. Nevertheless, definitions of selected terms are provided for clarity and consistency.

Abbreviations: NMR: Nuclear Magnetic Resonance; MS: Mass Spectrometry; m.p.: melting point; HRMS: High Resolution Mass Spectrometry; ICP-MS: Inductively Coupled Plasma Mass Spectrometry; SEC: Size-Exclusion Chromatography; TMS: Tetramethylsilane; EtOAc: Ethyl Acetate; $CH_2Cl_2$: Dichloromethane (DCM); $CDCl_3$: Chloroform-d; AcOH: Acetic acid; TLC: Thin Layer Chromatography; FCC: Flash Column Chromatography; TMP=2,2,6,6-tetramethylpiperidine; TIPS: triisopropylsilyl.

As used herein, the term "alkyl" refers to straight-chain or branched-chain alkyl residues. This also applies if they carry substituents or occur as substituents on other residues, for example in alkoxy residues, alkoxycarbonyl residues or arylalkyl residues. Substituted alkyl residues are substituted in any suitable position. Non-limiting examples of alkyl residues containing from 1 to 18 carbon atoms are methyl, ethyl, propyl, butyl, pentyl, hexyl, heptyl, octyl, nonyl, decyl, undecyl, dodecyl, tetradecyl, hexadecyl and octadecyl, the n-isomers of all these residues, isopropyl, isobutyl, isopentyl, neopentyl, isohexyl, isodecyl, 3-methylpentyl, 2,3,4-trimethylhexyl, sec-butyl, tert-butyl, or tert-pentyl. Non-specific alkyl residues may be formed by the residues methyl, ethyl, n-propyl, isopropyl, n-butyl, isobutyl, sec-butyl and tert-butyl.

As used herein, the term "lower alkyl" refers to straight-chain or branched alkyl residues comprising 1 to 6 carbon atoms. This also applies if they carry substituents or occur as substituents on other residues, for example in alkoxy residues, alkoxycarbonyl residues or arylalkyl residues. Substituted alkyl residues can be substituted in any suitable position. Non-limiting examples of lower alkyl residues containing from 1 to 6 carbon atoms are methyl, ethyl, propyl, isopropyl, butyl, isobutyl, tert-butyl, pentyl, isopentyl, neopentyl, and hexyl.

As used herein, the term "alkyloxy" is understood as being straight chain or branched chain alkyloxy groups, non-limiting examples of which include methoxy, ethoxy, propoxy, isopropoxy, n-butoxy, isobutoxy and t-butoxy.

As used herein, the term "cycloalkyl" is understood as being a carbon-based ring system, non-limiting examples of which include cyclopropyl, cyclobutyl, cyclopentyl and cyclohexyl.

As used herein, the term "arene" is understood as being an aromatic substituent which is a single ring or multiple rings fused together and which is optionally substituted. When formed of multiple rings, at least one of the constituent rings is aromatic. In an embodiment, arenes include phenyl, naphthyl, indenyl, indanyl, azulenyl, fluorenyl and anthracenyl.

The term "heteroarene" as used herein embraces fully unsaturated or aromatic heterocyclo groups. The heteroarene groups are either monocyclic, bicyclic, tricyclic or quadracyclic, provided they have a suitable number of atoms, for example from 3 to 30 atoms, and are stable. A bicyclic, tricyclic or quadracyclic heteroaryl group is fused, bridged and/or simply linked via a single bond. Non-limiting examples of heteroarene groups include unsaturated 3 to 6 membered heteromonocyclic groups containing 1 to 4 nitrogen atoms, for example, pyrrolyl, pyrrolinyl, imidazolyl, pyrazolyl, pyridyl, pyrimidyl, pyrazinyl, pyridazinyl, triazolyl (e.g., 4H-1,2,4-triazolyl, 1H-1,2,3-triazolyl, 2H-1,2,3-triazolyl, etc.), tetrazolyl (e.g. 1H-tetrazolyl, 2H-tetrazolyl, etc.), etc.; unsaturated condensed heterocyclo groups containing 1 to 5 nitrogen, oxygen and/or sulfur atoms including, for example, indolyl, isoindolyl, indolizinyl, benzimidazolyl, quinolyl, isoquinolyl, indazolyl, benzotriazolyl, tetrazolopyridazinyl (e.g., tetrazolo[1,5-b]pyridazinyl, etc.), etc.; unsaturated 3 to 6-membered heteromonocyclic groups containing an oxygen atom, including, for example, pyranyl, furyl, etc.; unsaturated 3 to 6-membered heteromonocyclic groups containing a sulfur or a selenium atom, including for example, thienyl, selenophen-yl, etc.; unsaturated 3- to 6-membered heteromonocyclic groups containing 1 to 2 oxygen atoms and 1 to 3 nitrogen atoms, including, for example, oxazolyl, isoxazolyl, oxadiazolyl (e.g., 1,2,4-oxadiazolyl, 1,3,4-oxadiazolyl, 1,2,5-oxadiazolyl, etc.) etc.; unsaturated condensed heterocyclo groups containing 1 to 2 oxygen atoms and 1 to 3 nitrogen atoms (e.g. benzoxazolyl, benzoxadiazolyl, etc.); unsaturated 3 to 6-membered heteromonocyclic: groups containing 1 to 2 sulfur atoms and 1 to 3 nitrogen atoms, including, for example, thiazolyl, thiadiazolyl (e.g., 1,2,4-thiadiazolyl, 1,3,4-thiadiazolyl, 1,2,5-thiadiazolyl, etc.) etc.; unsaturated condensed heterocyclo groups containing 1 to 2 sulfur atoms and 1 to 3 nitrogen atoms (e.g., benzothiazolyl, benzothiadiazolyl, etc.), unsaturated linked 5 or 6-membered heteromonocyclic groups containing 1 to 2 sulfur atoms and/or 1 to 3 nitrogen atoms, including, for example, bithienyl and trithienyl and the like. The term also embraces groups where heterocyclo groups are fused with aryl groups. Examples of such fused bicyclic groups include benzofuran, benzothiophene, benzopyran, and the like.

The term "substituted" as used herein, means that a hydrogen radical of the designated moiety is replaced with the group (residue) of a specified substituent, provided that the substitution results in a stable or chemically feasible compound. Non-limiting examples of substituents include halogen (F, Cl, Br, or I) for example F, and $C_{1-4}$alkyl.

The term "suitable" as used herein means that the selection of the particular compound or conditions would depend on the specific synthetic manipulation to be performed, and the identity of the molecule(s) to be transformed, but the selection would be well within the skill of a person trained in the art. All process/method steps described herein are to be conducted under conditions sufficient to provide the product shown. A person skilled in the art would understand that all reaction conditions, including, for example, reaction solvent, reaction time, reaction temperature, reaction pressure, reactant ratio and whether or not the reaction should be performed under an anhydrous or inert atmosphere, can be varied to optimize the yield of the desired product and it is within their skill to do so.

As used herein, the term "derivative" refers to a structural analog and designates a compound having a structure similar to that of another one, but differing from it in respect of a certain component. It can differ in one or more atoms, functional groups, or substructures, which are replaced with other atoms, groups, or substructures. A structural analog can be imagined to be formed, at least theoretically, from the other compound. Despite a high chemical similarity, structural analogs are not necessarily functional analogs and can have very different physical, chemical, biochemical, or pharmacological properties.

The expression "proceed to a sufficient extent" as used herein with reference to the reactions or process steps disclosed herein means that the reactions or process steps proceed to an extent that conversion of the starting material or substrate to product is maximized. Conversion may be maximized when greater than about 5, 10, 15, 20, 25, 30, 35, 40, 45, 50, 55, 60, 65, 70, 75, 80, 85, 90, 95 or 99% of the starting material or substrate is converted to product.

The term "protecting group" or "prot" as used in the present disclosure has the meaning usual in synthetic chemistry, such as for example for amine group protection. In an embodiment, it refers to any group that is covalently bound to an amine group, protecting it from undesirable reactions during synthetic procedures and is optionally removed after the synthetic procedures are complete. The conditions for bonding and removal of the protecting group are compatible with the remaining parts of the molecule. Commonly used amine-protecting groups are disclosed in Greene, "Protective Groups In Organic Synthesis, 3$^{rd}$ Edition" (John Wiley & Sons, New York, 1999), which is incorporated herein by reference. Non-limiting suitable protecting groups include BOC (tert-Butyloxycarbonyl).

The term "organoborane reagent" as used in the present disclosure refers to an organic derivative of borane ($BH_3$) and which is a source of boron in a reaction. Non-limiting examples of organoborane reagents include HBPin, HBCat and 9-BBN.

The term "frustrated Lewis pair" is used herein to refer to a compound or reagent containing a Lewis acid and a Lewis base which, because of steric hindrance or geometric constraints, cannot combine to form a bound adduct, or may not in fact form any adduct at all.

As used herein, the term "Lewis acid" refers to an electron pair acceptor.

As used herein, the term "Lewis base" refers to an electron pair donor.

The term HBPin as used herein refers to pinacolborane.

The term BBN as used herein refers to 9-borabicyclo [3.3.1]nonane.

As used herein, the term "functionalization reagent" refers to a reagent that operates to functionalize a $sp^2$-H bond when used in the metal-free catalytic process of the present disclosure. In a non-limiting embodiment of the present disclosure, the functionalization reagent is an organoborane reagent. In yet further non-limiting embodiments of the present disclosure, the functionalization reagents include, HBPin, HBCat and 9-BBN.

As used herein, the term "functionalized" refers to the replacement of the hydrogen of a $sp^2$-H bond with the functionalization reagent residue. The functionalized residue obtained following functionalization of a $sp^2$-H bond may subsequently serve as a substrate for further chemical transformations. It is well within the purview of the skilled artisan to determine such further chemical transformations based of a particular functionalized residue.

In an aspect, the present disclosure relates to a process for the borylation of $sp^2$ carbons. More specifically, but not exclusively, the present disclosure relates to processes for forming borylated arenes and heteroarenes.

In an aspect, the present disclosure relates to catalysts for the borylation of $sp^2$ carbons. In an embodiment of the present disclosure, catalysts for the borylation of $sp^2$ carbons include intramolecular FLPs. Such FLPs can be used as catalysts in metal-free catalytic systems for $C_{sp2}$—H bond cleavage and dehydrogenative borylation of alkenes, arenes and heteroarenes.

It was surmised that in the design of FLPs suitable for the metal-free activation of $C_{sp2}$—H, systems that comprise a small Lewis acidic $BH_2$ moiety would allow for an alkene, arene or heteroarene to be borylated to come into proximity of the boron atom and would stabilize the generated alkenyl, arenyl or heteroarenyl fragment while the presence of a basic moiety with steric bulk facilitates the abstraction of a hydrogen atom from the $C_{sp2}$ of the alkene, arene or heteroarene and prevents possible head-to-tail dimerization. In an embodiment of the present disclosure, the basic moiety is an amino-moiety. Non limiting examples of amino moieties include ~$NR^1R^2$ wherein $R^1$ and $R^2$ are independently selected from $C_{1-10}$alkyl. In a further embodiment, $R^1$ and $R^2$ are independently selected from $C_1$-alkyl, $C_2$-alkyl, $C_3$-alkyl, $C_4$-alkyl, $C_5$-alkyl, $C_6$-alkyl, $C_7$-alkyl, $C_8$-alkyl, $C_9$-alkyl, and $C_{10}$-alkyl. In a further embodiment, $R^1$ and $R^2$ are independently selected from $C_{1-5}$-alkyl. In a further embodiment, $R^1$ and $R^2$ are independently selected from substituted $C_1$-alkyl, $C_2$-alkyl, $C_3$-alkyl, $C_4$-alkyl, $C_5$-alkyl, $C_6$-alkyl, $C_7$-alkyl, $C_8$-alkyl $C_9$-alkyl and $C_{10}$-alkyl. In a further embodiment, $R^1$ and $R^2$ are connected together to form a nitrogen containing ring system that may optionally be substituted by 1, 2, 3, 4, 5, or 6 substituents. An arene linker between the Lewis moieties has been shown to be quite durable and adequate for the design of FLP catalysts.[20-23]

In an aspect of the present disclosure, the FLP catalyst has the following structure:

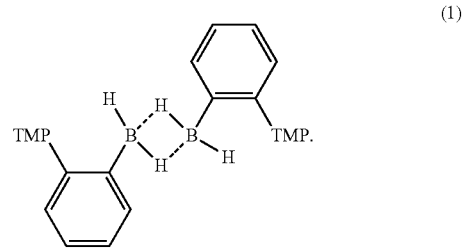

(1)

Compound 1 [(1-TMP-2-$BH_2$—$C_6H_4$)$_2$] was shown to be in equilibrium with its monomeric form and was previously reported to be an active species for hydrogen activation.[23]

$^1$H nuclear magnetic resonance (NMR) monitoring of the addition of 1-methylpyrrole to a solution of 1 in chloroform-d at 80° C. allowed to observe the evolution of $H_2$ (δ=4.63) and the formation of product 2 over a period of 5 hours, resulting from the C—H activation of 1-methylpyrrole at the 2 position (Scheme 1).

Scheme 1

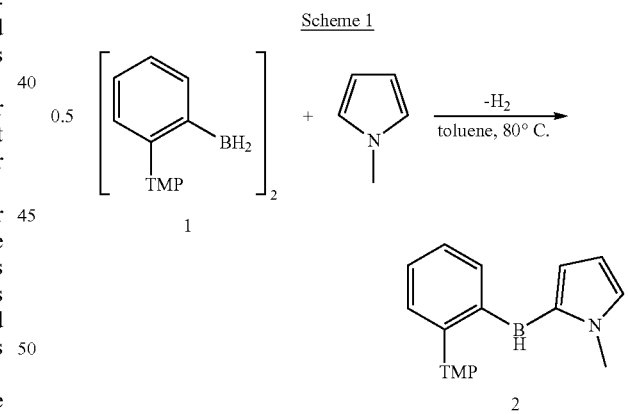

A similar reaction with 1-methylpyrrole-$d_4$ allowed to observe the evolution of HD and the unambiguous assignation of the resonances associated with the formation of the products resulting from the C—H activation of 1-methylpyrrole at the 2 position.

Product 2 was subsequently shown to further react with an organoborane reagent. In an embodiment of the present disclosure, 2 was shown to react with HBPin (Pin=pinacol) in a suitable solvent or solvent system over the course of 5 hours at ambient temperature, regenerating 1 by releasing organic species 1-Me-2-BPin-pyrrole (3a) (Scheme 2). In an embodiment of the present disclosure, the reaction of 2 with HBPin was carried in a chloroform-d solution.

Scheme 2

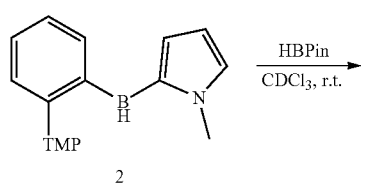

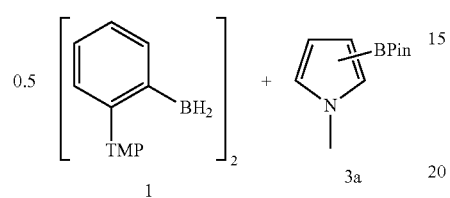

When equimolar amounts of 1-methylpyrrole and HBPin (1.22 mmol) were added to a solution of 1 in CHCl$_3$ (2.5 mol. %), the quantitative conversion of the reagents to a 93:7 ratio of 3a and 3a' could be observed by $^1$H NMR spectroscopy, confirming that 1 is a catalyst for the borylation reaction. An isolated yield of 93% was obtained when passing the reaction mixture through a short pad of silica to scrub the catalyst. It was also possible to use the same protocol on a multigram-scale reaction (0.22 mol) to isolate 3.76 g of the desired product (yield=81%). With a catalytic loading as low as 0.5 mol %, species 3a and 3a' were isolated in an overall yield of 72%. ICP-MS measurements of the crude reaction mixture, without any purification, was carried out to demonstrate that any noble metals present in the reaction system were below the international regulations. The borylation of 1-methylpyrrole was also possible using catecholborane or 9-borabicyclo[3.3.1]nonane. However, the observed yields were lower at 42% and 60%, respectively.

Functional group tolerance was also tested by running the borylation of 1-methylpyrrole in the presence of additives (Scheme 3). The results are illustrated in Table 1.

Scheme 3

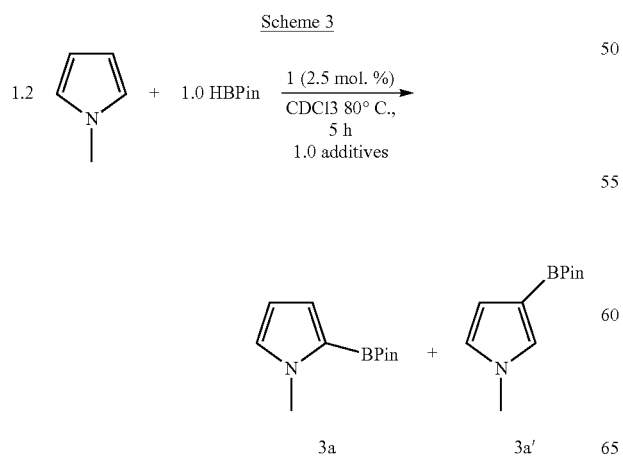

TABLE 1

Functional Group Tolerance of the Catalytic Borylation of N-methylpyrrole.

| Entry | Additive | Yield (%) |
|---|---|---|
| 1[a] | — | 95 |
| 2 | cyclohexene | 4 |
| 3 | Ph—≡—Ph | 0 |
| 4 | PhF | >99 |
| 5 | PhCl | 93 |
| 6 | Br—C$_6$H$_4$—Br | 90 |
| 7 | Br—(C)$_{10}$—Br | 88 |
| 8 | Ph$_3$N | 92 |
| 9 | Ph$_2$NH | 0 |
| 10 | Ph(CO)Ph | 0 |
| 11 | iPr—CN | 0 |
| 12 | cyclohexene oxide | 48 |
| 13 | thiophene | 88 |
| 14 | THF | 98 |
| 15 | DMF | 0 |
| 16 | benzofuran | 12 |
| 17 | 3-nitrotoluene | 31 |
| 18 | 4-Br-C$_6$H$_4$-CH(OEt)$_2$ | 68 |

TABLE 1-continued

Functional Group Tolerance of the Catalytic Borylation of N-methylpyrrole.

| Entry | Additive | Yield (%) |
|---|---|---|
| 19 | N—Boc (pyrrole) | 64 |
| 20 | PhCF$_3$ | 94 |
| 21 | HMPA | 87 |
| 22 | TMEDA | 24 |

Conditions:
0.4 mL CDCl$_3$, 0.018 mmol cat (5 mol %), 0.36 mmol additive (1.0 equiv.), 0.43 mmol N-methylpyrrole (1.2 equiv.), 0.36 mmol HBP in 80° C., 5 hours.
Yields (based on HBPin) determined by NMR integration with respect to the internal standard of hexamethylbenzene which was introduced before the start of the reaction.
$^a$Control reaction without the presence of any additive.

An initial determination of the scope of the borylation reaction was made by subjecting a variety of substrates to the borylation conditions (Table 2). The catalytic borylation is tolerant to several functional groups but can be inhibited in presence of alkynes, alkenes and ketones. Unless otherwise specified, the reactions were performed using 1 (14 mg, 0.0305 mmol, 2.5 mol. %), HBPin (156 mg, 1.22 mmol), and substrate (n×1.22 mmol) in CHCl$_3$ (5 mL) at 80° C. The conversions are given with respect to the transformation of HBPin to the borylated product as measured by $^1$H NMR spectroscopy at the end of the reaction. Isolated yields are also provided.

Although the reaction does not proceed with pyrrole, likely because of the presence of the reactive N—H bond, the reaction did proceed with N-benzyl protected pyrrole to generate a 3:2 mixture of 3b and 3b', isolated in 90% yield. The borylation of the bulkier 1-TIPS-pyrrole provided species 3c in 98% isolated yield, while the borylation of 1-TMS-pyrrole provided 3d in 76% isolated yield. For 1-Me-indole, quantitative conversion to 3e (85% isolated yield) was observed. However, the presence of the electron-withdrawing tert-butyloxycarbonyl group (BOC) on the indole moiety inhibited the reaction completely.

Whereas the borylation of thiophene was not possible, the electron rich 3,4-ethylenedioxythiophene provided the expected borylated products in good yield. By adding 0.5 or 2 equiv. of HBPin, it was possible to observe quantitative conversion to the mono- (3f) or diborylated (3g) products, which were isolated in 87% and 92% yield respectively. Similarly, 2-methoxythiophene was borylated to 3h in 85% isolated yield.

Furan provided borylated species 3i in 81% yield, while 2-methylfuran and 2-t-butylfuran provided the borylated products 3j and 3k in 80% and 86% yield, respectively. Regarding the conversion of the methoxide derivative to the borylated product 3l, a 74% conversion was observed by $^1$H NMR spectroscopy (isolated yield 62%). 2-Trimethylsiloxyfuran provided the corresponding borylated species 3m in 84% yield. 1 was also used to borylate bromide-containing substrates as shown by 3n and 3n' in a 1:0.9 ratio (79% yield).

In an aspect of the present disclosure, the FLP catalyst has the following structure of Formula II:

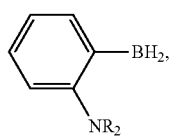

Formula II wherein NR$_2$ is chosen from NMe2, NEt$_2$ and piperidine. A general synthesis for these analogs is provided in Scheme 4.

Scheme 4

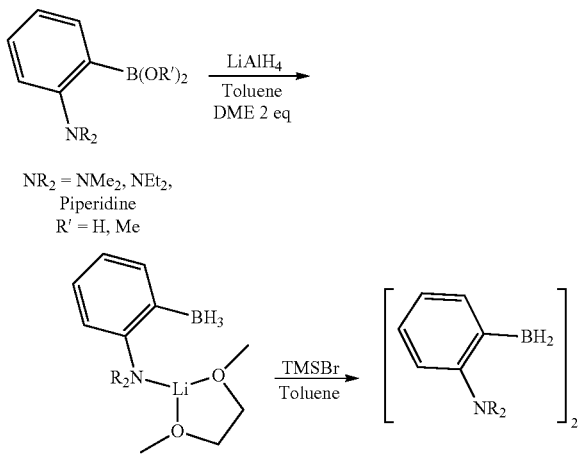

NR$_2$ = NMe$_2$, NEt$_2$, Piperidine
R' = H, Me

TABLE 2

Scope of the Borylation Reaction Catalyzed by 1 on a Variety of Substrates.

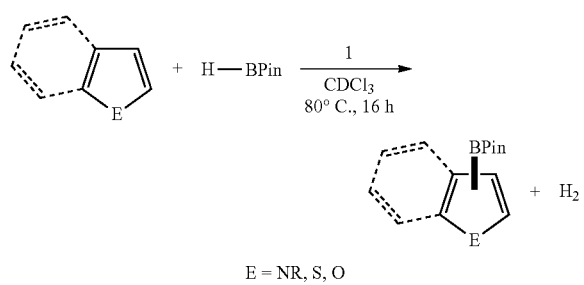

E = NR, S, O

3a

3a'

93:7
5 h, n = 1
Conv: Quant
Yield: 93%

3b

TABLE 2-continued

Scope of the Borylation Reaction Catalyzed by 1 on a Variety of Substrates.

[Reaction scheme: heteroarene + H—BPin → borylated heteroarene + H₂, with catalyst 1, CDCl₃, 80° C., 16 h; E = NR, S, O]

3b′ N-benzyl-3-BPin-pyrrole
3:2
n = 2
Conv: Quant
Yield: 90%

3c N-TIPS-3-BPin-pyrrole
n = 2.5
Conv: Quant.
Yield: 98%

3d N-TMS-3-BPin-pyrrole
n = 4
Yield: 76%

3e N-methyl-3-BPin-indole
n = 2
Conv: Quant
Yield: 85%

3f EDOT-BPin
n = 2
Conv: Quant
Yield: 87%

3g EDOT-2,5-bis(BPin)
n = 0.5
Conv: Quant
Yield: 92%

3h 2-MeO-5-BPin-thiophene
n = 1
Conv: Quant
Yield: 85%

3i 2-Bpin-furan
n = 1.2
Yield: 81%

3j 2-methyl-5-Bpin-furan
n = 1.2
Conv: Quant
Yield: 80%

3k 2-tBu-5-Bpin-furan
n = 1.2
Conv: Quant
Yield: 86%

3l 2-MeO-5-Bpin-furan
n = 1
Conv: 74%
Yield: 62%

3m 2-TMSO-5-Bpin-furan
n = 1.2
Conv: Quant
Yield: 84%

TABLE 2-continued

Scope of the Borylation Reaction Catalyzed by 1 on a Variety of Substrates.

E = NR, S, O

3n

1:0.9
(100° C., 36 h), n = 4[a]
Conv: 90%
Yield: 79%

3n'

Various experiments were performed aimed at optimizing the catalytic borylation of N-methylpyrrole. Various borane reagents, catalysts and reactions conditions were analyzed (Table 3).

Optimization of the Catalytic Borylation of N-Methylpyrrole

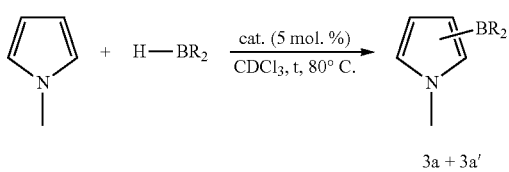

3a + 3a'

TABLE 3

Optimization of the Catalytic Borylation of N-methylpyrrole

| Entry | Catalyst | HBR$_2$ | Time (h) | Yield (%) |
|---|---|---|---|---|
| 1 | — | HBPin | 24 | 0 |
| 2 | TMP-phenyl | HBPin | 24 | 0 |
| 3 | TMP-phenyl-I | HBPin | 24 | 0 |
| 4 | 1 (0.5 eq.) | HBPin | 5 | >95[a] |
| 5 | 1 (0.5 eq.) | HBCat | 12 | 42 |
| 6 | 1 (0.5 eq.) | 9-BBN | 12 | 60 |

Table 3 illustrates that the borylation reaction does not occur in presence of the Lewis base TMP alone (entries 2 and 3) and that the presence of the FLP is mandatory for this reaction to occur.

Density functional theory (DFT) calculations were carried out in view of determining a mechanism for the borylation process, using N-methylpyrrole as the model substrate (FIG. 2). After dissociation of the dimer, the rate determining step in the borylation process was calculated to be the C—H activation of the substrate by species 1, generating the zwitterionic species 1*. Once 1* has been generated, there is a rapid release of H$_2$ to generate 2, a process that has been shown to readily occur with 1.[23] Finally, the formation of 3a is possible in the presence of HBPin via a four-centre sigma-bond metathesis, regenerating 1 in the process. Even though C—H activation appears favored with electron-rich substrates, electron poor substrates can also be used in the process of the present disclosure. Electron-rich substrates generally comprise electron-donating substituents whereas electron-poor substrates generally comprise electron withdrawing substituents. Non-limiting examples of electron donating groups include ethers, amines, substituted amines, hydroxyl, amide and ester groups. Non-limiting examples of electron withdrawing groups include, halogen, aldehyde, CF$_3$, nitrile, SO$_3$H, ammonium and nitro substituents. It is well within the purview of the skilled artisan to determine further electron donating and electron withdrawing groups.

Whereas the 24.4 kcal·mol$^{-1}$ barrier for C—H activation of the proton in the 2-position of N-methylpyrrole is favored, the activation of the proton in the 3-position is also possible, the latter being only 0.4 kcal·mol$^{-1}$ higher in energy. This small energy difference would explain the minor mount of 3a' observed following the borylation process. Moreover, these energy barriers are consistent with catalytic processes operating at 80° C. Competition experiments at 80° C. between 1-methylpyrrole and 1-methylpyrrole-d$_4$ were performed to measure a kinetic isotope effect (KIE) of 1.8 for the stoichiometric C—H bond activation with formation of 2 and of 1.9 for the catalytic borylation. The relatively low KIE value of 1.9 is similar to that observed for the concerted metalation-deprotonation of the palladium-catalyzed arylation reaction with similar substrates.[24-25] These values support the calculated transition state which indicates that the electrophilic attack of the boron on the carbon is an important driving force for this reaction to occur. As observed by the lack of reactivity of 1 with thiophene or benzene, for which the activation was computed using DFT to be more endothermic with C—H activation transition state energies of 27.7 and 38.1 kcal·mol$^{-1}$ respectively, the acidity of the proton does not play an important role on the observed activity, contrarily to most transition metal activated systems.[27]

EXPERIMENTAL

A number of examples are provided herein below illustrating the borylation of various substrates using the process of the present disclosure. In accordance with an embodiment of the present disclosure, the borylation of various substrates is performed using 1. The following non-limiting examples are illustrative of the present disclosure.

Materials

Chemicals:

Unless specified otherwise, manipulations were carried out under a nitrogen atmosphere using standard glovebox and Schlenk techniques. Toluene and hexane were purified by distillation over Na/benzophenone. Chloroform used in catalytic reactions was dried by distillation over $P_2O_5$. $CDCl_3$ used for test catalytic reactions was similarly treated. Catalytic reactions, unless specified otherwise, were carried out in oven-dried sealable vials. $Al_2O_3$ was purchased from Sigma-Aldrich and activated by heating in a Schlenk flask at 300° C. under vacuum (20 millitorr) for 16 hours. Heteroaromatic substrates were purchased from Sigma-Aldrich or Alfa Aesar or prepared according to known literature procedures[27-28] and stored in a glovebox over 4 Å molecular sieves. N-methylpyrrole was distilled from KOH and flame-dried $MgSO_4$. 2-Methoxyfuran (Alfa), 2-Methoxythiophene (Aldrich), Furan (Aldrich), 2-Methylfuran (Aldrich) and N-benzylpyrrole were passed through a short pad of alumina before use. 3,4-Ethylenedioxythiophene was distilled before use. Pinacolborane was purchased from Sigma-Aldrich and used as received.

Instrumentation/Characterization:

NMR spectra were recorded on an Agilent Technologies NMR spectrometer at 500 MHz ($^1H$), 125.758 MHz ($^{13}C$), 160.46 MHz ($^{11}B$) and on a Varian Inova NMR AS400 spectrometer, at 400.0 MHz ($^1H$), 100.580 MHz ($^{13}C$). $^1H$ NMR and $^{13}C\{^1H\}$ NMR chemical shifts were referenced to residual protons or carbons in deuterated solvent. $^{11}B\{^1H\}$ was calibrated using an external $BF_3.Et_2O$ reference. Multiplicities were reported as singlet (s), broad singlet (s, br) doublet (d), triplet (t) or multiplet (m). Chemical shifts were reported in ppm. Coupling constants were reported in Hz.

Computational Details:

All the calculations were performed on the full structures of the reported compounds. Calculations were performed with the GAUSSIAN 09 suite of programs.[30] The ωB97XD functional[31] was qualified as promising by Grimme[32] and was used to describe the mechanism of FLP mediated hydrogenation of alkynes which implicates protodeborylation[33] and was thus used in combination with the 6-31G basis set for all atoms.[34] The transition states were located and confirmed by frequency calculations (single imaginary frequency). The stationary points were characterized as minima by full vibration frequency calculations (no imaginary frequency). All geometry optimizations were carried out without any symmetry constraints. The energies were then refined by single point calculations to include solvent effects using the SMD solvation model[35] with the experimental solvent, chloroform as well as benzene at the ωB97XD/6-31+G level of theory.[36]

Synthesis of Catalyst 1

1 was synthesized using the procedure reported by Repo and co-workers with minor modifications.[23] In a Schlenk tube, [2-(2,2,6,6-tetramethylpiperidin-1-yl)phenyl]lithium (4.2 g; 18.8 mmol) were suspended in ca dry toluene (ca 90 ml) and cooled to −80° C. Borane dimethyl sulfide complex (3.6 ml; 37.6 mmol; 2 eq.) was added via syringe in one portion. The reaction was stirred at −60 to −80° C. for 2 h, then allowed to warm to room temperature within 1 h and stirred overnight. Trimethylsilyl bromide (2.6 ml, 19.7 mmol, 1.05 eq.) was added in one portion via syringe and the reaction was stirred for another 4 h at room temperature after which volatiles were removed under vacuum (1 mbar). The residue was dispersed in hot hexane (ca. 50 mL) and was filtered hot. The filter cake was washed two times with additional of hot hexane (ca. 25 mL) and the combined liquors were left to crystallize at −35° C. After ca. 48 h the supernatant was removed by filtration and the crystals washed twice with cold hexane (2×25 mL, −60° C.). After evaporation of the volatiles in vacuo, 2.24 g (52% yield) of white crystalline powder was obtained. Spectroscopic measurements corresponded to that of pure 1.

$^1H$ NMR Monitoring of the C—H Activation of N-Methylpyrrole by 1

In a glovebox, 300 mg (1.654 mmol) of 1 was dissolved in ca. 25 ml of toluene and placed into a Schlenk tube. 116 μL (106 mg, 1.31 mmol) of 1-methylpyrrole was subsequently added by pipet. The reaction mixture was heated under nitrogen to 80° C. for 5 h and then evaporated to dryness in vacuo. The resulting thick orange oil proved to be difficult to handle and attempts to isolate 2 from the small impurities failed (presumed to be the activation of 1-methylpyrrole at the 3 position and/or a double activation of 1-methylpyrrole). Instead, it was characterized as is and used without further purification. The structure of the product could be unambiguously assigned as that of 2 by its $^1H$ and $^{13}C$ NMR signature. A similar reaction using a mixture of 1-methylpyrrole and 1-methylpyrrole-$d_4$ confirmed the assignation of the aromatic pyrrole ($NC_4H_3$) since they do not integrate for the unity as expected for a D-containing product.

$^1H$ NMR (500 MHz, $C_6D_6$) δ 7.85 (dd, J=7.3, 1.8 Hz, 1H, $C_6H_4$), 7.37 (dd, J=8.0, 1.1 Hz, 1H, $C_6H_4$), 7.27 (ddd, J=8.0, 7.2, 1.9 Hz, 1H, $C_6H_4$), 7.19 (dt, J=7.3, 1.1 Hz, 1H, $C_6H_4$), 7.17 (dd, J=3.9, 1.5 Hz, 1H, $NC_4H_3$), 6.54 (t, J=1.9 Hz, 1H, $NC_4H_3$), 6.25 (dd, J=3.9, 2.3 Hz, 1H, $NC_4H_3$), 3.35 (s, 3H, $NCH_3$), 1.30 (s, 6H, TMP($Me_2$)), 0.95 (s, 6H, TMP($Me_2$)), cyclic TMP signals were found as poorly resolved multiplets in the 2.0-0.9 area. $^{13}C\{^1H\}$ NMR (126 MHz, $C_6D_6$) δ 152.8, 136.1, 132.2, 131.4, 129.7, 128.4, 125.2, 110.5, 55.4, 42.5, 34.6, 26.0, 19.1. $^{11}B\{^1H\}$ NMR (160 MHz, $CDCl_3$): δ 54.3 (br).

Preparation of 2

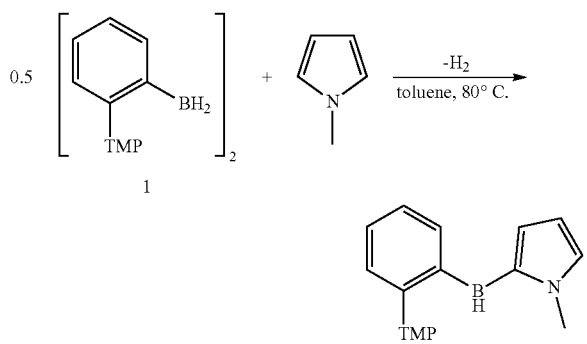

$^1H$ NMR Monitoring of the Borylation Reaction of 2

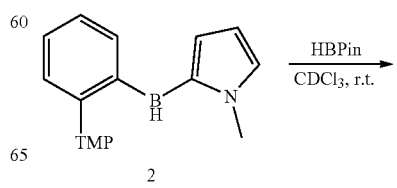

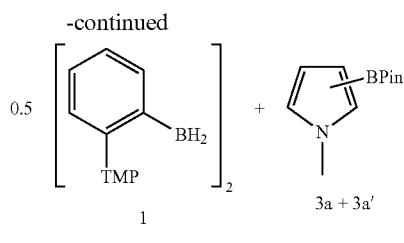

2 (20.0 mg; 0.0649 mmol) was dissolved in CDCl$_3$ and placed into a J-Young NMR tube. HBPin (0.129 mmol, 16.6 mg, 18.2 µL) was added by pipet and the resulting mixture was immediately analyzed by $^{11}$B{$^1$H} NMR (total acquisition time: 30 minutes). The analysis revealed complete conversion of 2 to 1. The concomitant generation of 3a could not be confirmed by $^{11}$B NMR because of the overlap of the signal with HBPin but could be seen by $^1$H NMR. The $^1$H NMR spectrum was taken before the $^{11}$B NMR spectrum and within 10 minutes of the addition of HBPin to 2.

Isotopic Labelling Experiments

Competitive Stoichiometric C—H Activation of N-Methylpyrrole and N-Methylpyrrole-d$_4$

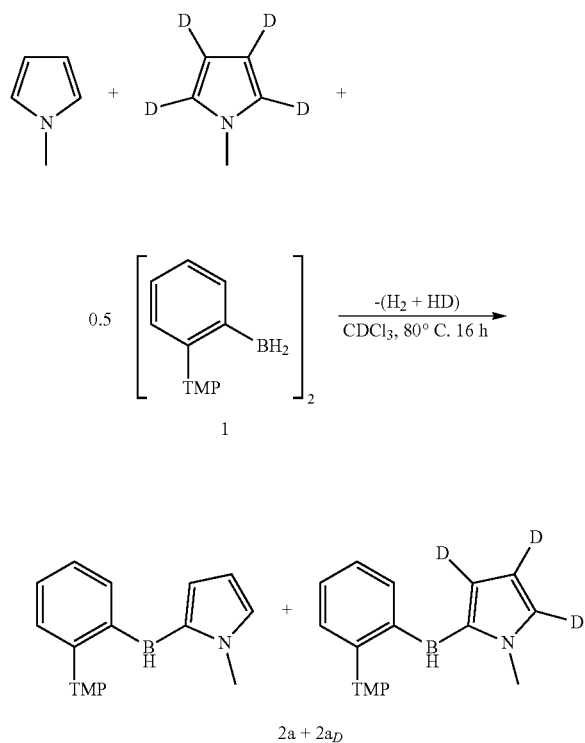

1 (26.3 mg, 0.057 mmol) and hexamethylbenzene (7.6 mg, 0.047 mmol) in ca. 0.5 mL CDCl$_3$ were introduced in a J-Young NMR tube. 10.2 µL (9.3 mg, 0.11 mmol) of each 1-methylpyrrole and 1-methylpyrrole-d$_4$ was added by pipet. Immediate $^1$H NMR analysis showed that the actual H/D ratio in 1-methylpyrrole at the start was 43:57. After heating the mixture to 80° C. for 16 hours, $^1$H NMR showed a H/D ratio in 2a of 57:43. A KIE $k_H/k_D$=1.8 can be calculated for this reaction considering the starting ratio of products.

Competitive Catalytic Borylation of N-Methylpyrrole and N-Methylpyrrole-d$_4$

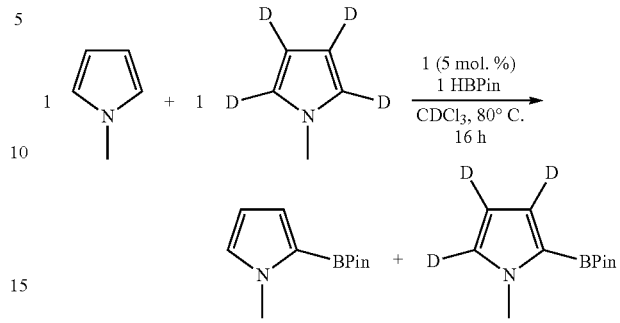

0.4 mL of the CDCl$_3$ stock solution of catalyst 1 (2.06 mg) was introduced in a J-Young NMR tube along with HBPin (26.1 µL, 23.0 mg, 0.18 mmol) and N-methylpyrrole and N-methylpyrrole-d$_4$ (15.9 µL, 14.6 mg, 0.18 mmol of each). The resulting mixture was heated to 80° C. for 16 hours and analyzed by $^1$H NMR (long relaxation times have to be allowed for correct quantitative analysis). A 65:35 H:D ratio was measured in the end product, while a ratio of 35:65 was found for the starting material, indicating that the catalytic borylation occurred with a KIE $k_H/k_D$=1.9.

For many C—H activation processes with transition metals, it is quite common to have KIE values exceeding 5 when the abstraction of the proton by the metal is the main component of the transition state.[27] In carboxylate-mediated C—H activation at palladium, the values of KIE observed are smaller, being around 2.0 at 100° C. since an important component of the C—H activation process involves an attack of the metal at the carbon atom, with simultaneous deprotonation by the carboxylate.[26] The values observed in the present system are consistent with the latter system, but the lower KIE at lower temperature indicates that the electrophilic attack of the boron at the carbon is playing a very significant role in the transition state compared to the deprotonation by the Lewis base.

Evaluation of Functional Group Tolerance

In order to evaluate the tolerance of the catalytic process towards various functional groups, the catalytic borylation of N-methylpyrrole was performed in the presence of additives containing various functional groups. For such a study, a solution containing catalyst 1 (11.3 mmol·L$^{-1}$) and hexamethylbenzene (42.6 mmol·L$^{-1}$) was prepared. In a typical experiment, 0.4 mL of solution (0.0090 mmol) was introduced by automatic pipet into a J-Young or normal NMR tube, followed by HBPin (26.1 mL, 23.0 mg, 0.18 mmol), N-methylpyrrole (19.1 mL, 17.5 mg, 0.22 mmol) and an additive (0.18 mmol). The resulting solution was heated to 80° C. in an oil bath for 5 hours before being analyzed by $^1$H NMR.

ICP-MS Quantification of Trace Metals in the Catalytic Mixture

The catalytic borylation of N-methylpyrrole was performed using the conditions specified below. At the end of the reaction, an aliquot of the reaction mixture was taken to ascertain the completion of the reaction. Instead of purifying, isolating and quantifying the product, the reaction mixture was dried in vacuo and an aliquot of 100 mg was taken and added to a mixture containing concentrated HNO$_3$ (18 ml) and concentrated HCl (2 ml). This mixture was heated to 175° C. under pressure of 120 psi for 20 minutes before being diluted and analyzed by ICP-QQQ-MS to quantify the metal content. Results are reported as the average of two sample solutions analyzed 10 times each (Table 4).

TABLE 4

Concentration of Various Metals in the Unpurified Reaction Mixture of the Borylation of N-methylpyrrole by HBP in Catalyzed by 1.

| Metal | Concentration (ppm) |
|---|---|
| Co | 0.00 ± 0.03 |
| Mo | 0.000 ± 0.002 |
| Ru | 0.000 ± 0.002 |
| Rh | 0.00 ± 0.01 |
| Pd | 0.13 ± 0.02 |
| Ag | 0.04 ± 0.03 |
| Os | 0.4 ± 0.3 |
| Ir | 0.03 ± 0.01 |
| Pt | 0.4 ± 0.4 |
| Au | 3 ± 2 |
| Tl | 0.00 ± 0.05 |

General Procedure for the Metal-Free Catalytic Borylation of Heteroarenes.

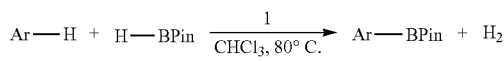

In a nitrogen-filled glovebox, a 0.0305 M stock solution of 1 in CHCl$_3$ was prepared. 1 mL of this solution was introduced by pipet to a sealable 25 mL microwave vial equipped with a magnetic stirring bar and diluted in additional CHCl$_3$ (4 mL). To this solution was added HBPin and the heteroaromatic substrate in specified quantities. The vial was subsequently sealed and heated with stirring to 80° C. for 16 hours, after which the mixture was cooled down to room temperature and p-xylene or mesitylene (60 μL) was added. An aliquot of the reaction mixture was analyzed by $^1$H NMR to determine the conversion, which was measured with regard to the resonance of the pinacol moieties. Heteroaromatic boronates were often found to be of dubious stability, especially in the case of furyl boronates. For this reason, the reaction mixture was purified by rapid passage through a very short pad of silica with vacuum suction, along with CH$_2$Cl$_2$ for rinsing. Such a treatment proved sufficient to remove the catalyst and yields the borylated product with good purity after vacuum evaporation of solvents and volatiles. Longer flash chromatography columns, on the other hand, tended to reduce the yields of obtained products.

Borylation of N-methylpyrrole

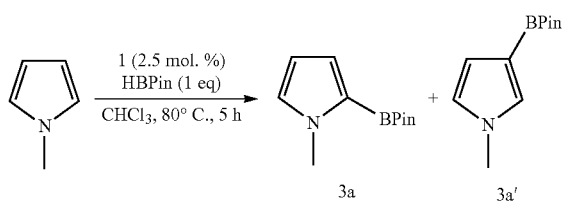

The general procedure was followed with the reaction time reduced to 5 hours. N-methylpyrrole (109 μL, 99.1 mg, 1.22 mmol) was reacted with HBPin (177 μL, 156 mg, 1.22 mmol). Complete conversion was observed by NMR and 235 mg (93%) of a 93:7 mixture of N-methyl-2-(4,4,5,5-tetramethyl-1,3,2-dioxaborolan-2-yl)pyrrole and N-methyl-3-(4,4,5,5-tetramethyl-1,3,2-dioxaborolan-2-yl)pyrrole as a white solid was obtained. NMR characterization was conform to that of the reported products.[12]

Borylation of N-Methylpyrrole

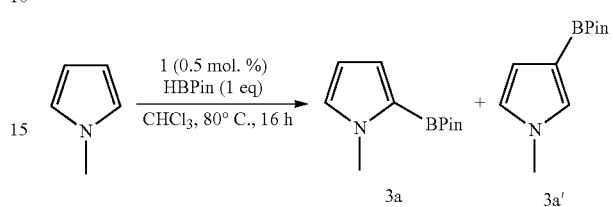

The catalyst loading for the borylation of N-methylpyrrole could be decreased to 0.5 mol %. To assess this, the catalytic reaction was performed using 0.2 mL of the 0.611 M stock solution of 1. N-methylpyrrole (109 μL, 99.1 mg, 1.22 mmol) and HBPin (177 μL, 156 mg, 1.22 mmol) were subsequently added by pipet and the sealed vial was heated to 80° C. with stirring. After 16 h, a conversion of 92% was observed by NMR and 182 mg (72%) of a 86:14 mixture of N-methyl-2-(4,4,5,5-tetramethyl-1,3,2-dioxaborolan-2-yl)pyrrole and N-methyl-3-(4,4,5,5-tetramethyl-1,3,2-dioxaborolan-2-yl)pyrrole as a white solid was obtained.

N-methyl-2-(4,4,5,5-tetramethyl-1,3,2-dioxaborolan-2-yl)pyrrole (3a): $^1$H NMR (400 MHz, Chloroform-d) δ 6.81 (m, 2H), 6.15 (m, 1H), 3.84 (s, 3H), 1.31 (s, 12H); $^{13}$C{$^1$H} NMR (101 MHz): 128.27, 121.98, 108.62, 83.21, 77.16, 36.69, 24.95; $^{11}$B{$^1$H} NMR (160 MHz): 28.1.

N-Methyl-3-(4,4,5,5-tetramethyl-1,3,2-dioxaborolan-2-yl)pyrrole (3a'): $^1$H NMR (400 MHz, Chloroform-d) δ 7.06 (m, 1H), 6.64 (m, 1H), 6.47 (m, 1H), 3.81 (s, 3H), 1.29 (s, 12H). While 3a' can be identified by its $^1$H NMR spectrum, it was not found in sufficient concentration to be characterized by $^{11}$B and $^{13}$C NMR.

Borylation of N-methylindole

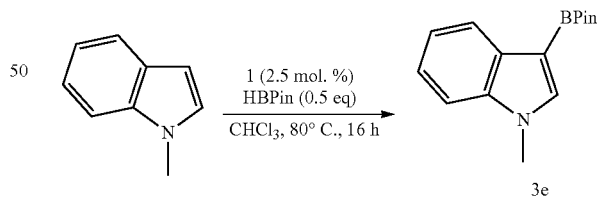

The general procedure was followed using N-methylindole (305 μL, 321 mg, 2.44 mmol) and HBPin (177 μL, 156 mg, 1.22 mmol). Complete conversion was observed by NMR and 267 mg (85%) of N-methyl-3-(4,4,5,5-tetramethyl-1,3,2-dioxaborolan-2-yl)indole was obtained as pale yellow crystals. NMR characterization was conform to that of the reported product.[12].

$^1$H NMR (400 MHz, Chloroform-d) δ 8.04 (ddd, J=7.7, 1.4, 0.8 Hz, 1H), 7.52 (s, 1H), 7.35-7.31 (m, 1H), 7.25-7.15 (m, 2H), 3.80 (s, 3H), 1.37 (s, 12H); $^{13}$C{$^1$H} NMR (101 MHz, CDCl$_3$): δ 138.6, 138.0, 132.6, 122.8, 121.9, 120.3, 109.3, 82.9, 33.1, 25.0. $^{11}$B{$^1$H} NMR (160 MHz, CDCl$_3$): δ 29.7. M$^+$: 257.16 (calc.: 257.16).

Borylation of N-benzylpyrrole

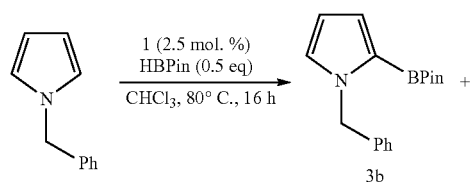

The general procedure was followed using N-benzylpyrrole (377 μL, 384 mg, 2.44 mmol) and HBPin (177 μL, 156 mg, 1.22 mmol). Complete conversion was observed by NMR and 311 mg (90%) of a 3:2 mixture of N-benzyl-2-(4,4,5,5-tetramethyl-1,3,2-dioxaborolan-2-yl)pyrrole (3b) and N-benzyl-3-(4,4,5,5-tetramethyl-1,3,2-dioxaborolan-2-yl)pyrrole (3b') was obtained as a colorless oil which rapidly became light pink. NMR characterization was conform to that reported for N-benzyl-3-(4,4,5,5-tetramethyl-1,3,2-dioxaborolan-2-yl)pyrrole.[37] N-Benzyl-2-(4,4,5,5-tetramethyl-1,3,2-dioxaborolan-2-yl)pyrrole (3b) is a new compound.

N-Benzyl-2-(4,4,5,5-tetramethyl-1,3,2-dioxaborolan-2-yl)pyrrole (3b): $^1$H NMR (400 MHz, Chloroform-d) δ 7.30-7.17 (m, 3H), 7.12-7.06 (m, 2H), 6.89 (dd, J=2.4, 1.6 Hz, 1H), 6.86 (dt, J=3.6, 1.9 Hz, 1H), 6.23-6.19 (m, 1H), 5.39 (s, 2H), 1.24-1.21 (m, 13H);

N-Benzyl-3-(4,4,5,5-tetramethyl-1,3,2-dioxaborolan-2-yl)pyrrole (3b'): $^1$H NMR (400 MHz, Chloroform-d) δ 7.36-7.26 (m, 3H), 7.17-7.12 (m, 3H), 6.73-6.68 (m, 1H), 6.51 (dd, J=2.6, 1.7 Hz, 1H), 5.06 (s, 2H), 1.31 (s, 12H);

Mixture: $^{13}$C{$^1$H} NMR (126 MHz, CDCl$_3$) δ 139.8, 137.7, 130.4, 128.9, 128.5, 127.9, 127.7, 127.5, 127.2, 127.0, 122.4, 122.3, 114.6, 109.1, 83.3, 82.9, 53.5, 52.9, 25.0, 24.8. $^{11}$B{$^1$H} NMR (160 MHz, CDCl$_3$): δ 27.8. M$^+$: 283.16 (calc.: 283.17).

Borylation of 1-(triisopropylsilyl)pyrrole

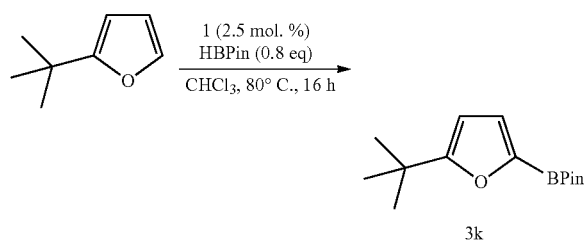

The general procedure was followed with 2-tert-butylfuran (209 μL, 182 mg, 1.47 mmol) and HBPin (177 μL, 156 mg, 1.22 mmol). Complete conversion was measured by $^1$H NMR and 258 mg (86%) of 2-(4,4,5,5-tetramethyl-1,3,2-dioxaborolan-2-yl)-5-tertButylfuran was obtained as pale yellow oil.

$^1$H NMR (400 MHz, CDCl$_3$) δ 6.98 (d, J=3.3 Hz, 1H), 6.02 (d, J=3.3 Hz, 1H), 1.33 (s, 12H), 1.31 (s, 9H). $^{13}$C{$^1$H} NMR (101 MHz, CDCl$_3$) δ 169.9, 124.8, 103.3, 84.0, 77.2, 33.1, 29.3, 24.9. $^{11}$B{$^1$H} NMR (160 MHz, CDCl$_3$): δ 27.4. M$^+$: 250.15 (calc.: 250.17).

Borylation of 1-(trimethylsilyl)pyrrole

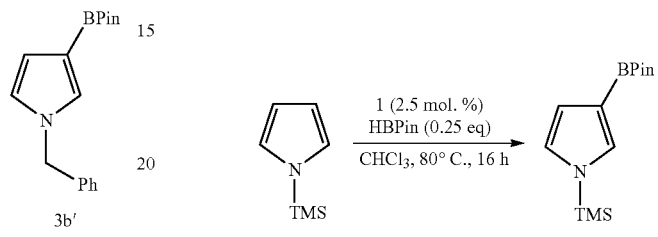

The general procedure was followed with 1-(trimethylsilyl)pyrrole (680 mg, 4.89 mmol) and HBPin (177 μL, 156 mg, 1.22 mmol). A conversion of 75% was observed by $^1$H NMR and 342 mg (98%) of 1-trimethylsilyl-3-(4,4,5,5-tetramethyl-1,3,2-dioxaborolan-2-yl)pyrrole was obtained as a colorless solid after thorough evaporation of the volatile under vacuum.

$^1$H NMR (400 MHz, CDCl$_3$) δ 7.28 (m, 1H), 6.83 (t, J=2.2, 1H), 6.63 (m, 1H), 1.35 (s, 12H), 1.32 (s, 12H), 0.42 (9H). $^{13}$C{$^1$H} NMR (126 MHz, CDCl$_3$) δ 132.9, 124.0, 116.3, 83.0, 77.2, 25.0, −0.2. $^{11}$B{$^1$H} NMR (160 MHz, CDCl$_3$): δ 30.0. M$^+$: 365.12 (calc.: 265.17).

Monoborylation of 3,4-ethylenedioxythiopthene

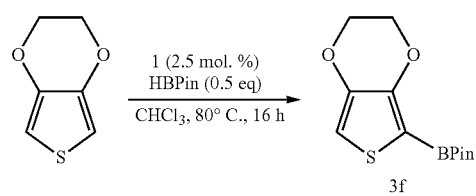

The general procedure was followed using 3,4-ethylenedioxythiophene (261 μL, 347 mg, 2.44 mmol) and HBPin (177 μL, 156 mg, 1.22 mmol). Complete conversion was observed by $^1$H NMR and 285 mg (87%) of 2-(4,4,5,5-tetramethyl-1,3,2-dioxaborolan-2-yl)-3,4-ethylenedioxythiophene was obtained as a white crystalline solid. NMR characterization was conform to that of the reported product.[38]

$^1$H NMR (500 MHz, Chloroform-d) δ 6.63 (s, 1H), 4.31-4.28 (m, 2H), 4.19-4.17 (m, 2H), 1.34 (s, 12H); $^{13}$C{$^1$H} NMR (126 MHz, CDCl$_3$) δ 149.2, 142.5, 107.6, 84.0, 65.2, 64.4, 24.9. $^{11}$B{$^1$H} NMR (160 MHz, CDCl$_3$): δ 28.2. M$^+$: 268.13 (calc.: 268.09).

Diborylation of 3,4-ethylenedioxythiophene

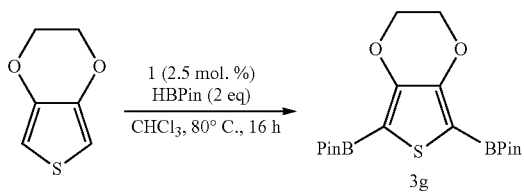

The general procedure was followed using 3,4-ethylenedioxythiophene (65 µL, 87 mg, 0.611 mmol) and HBPin (177 µL, 156 mg, 1.22 mmol). Complete conversion was observed by NMR and 443 mg (92%) of 2-(4,4,5,5-tetramethyl-1,3,2-dioxaborolan-2-yl)-3,4-ethylenedioxythiophene was obtained as a pale yellow crystalline solid. NMR characterization was conform to that of the reported product.[39]

$^1$H NMR (500 MHz, Chloroform-d) δ 4.27 (s, 2H), 1.32 (s, 12H). $^{13}$C{$^1$H} NMR (101 MHz, CDCl$_3$) δ 149.0, 84.0, 64.8, 24.9. $^{11}$B{$^1$H} NMR (160 MHz, CDCl$_3$). δ 28.4. M$^+$: 394.24 (calc.: 394.18).

Borylation of 2-methoxythiophene

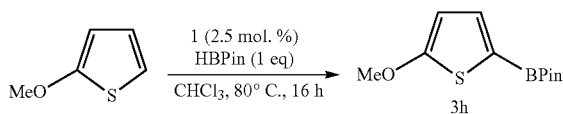

The general procedure was followed using 2-methoxythiophene (123 µL, 140 mg, 1.22 mmol) and HBPin (177 µL, 156 mg, 1.22 mmol). Complete conversion was measured by NMR and 249 mg (85%) of 2-(4,4,5,5-tetramethyl-1,3,2-dioxaborolan-2-yl)-5-methoxythiophene was obtained as a pale yellow oil.

$^1$H NMR (400 MHz, Chloroform-d) δ 7.33 (d, J=3.9, 1H), 6.30 (dd, J=3.9, 1H), 3.92 (s, 3H), 1.32 (s, 12H). $^{13}$C{$^1$H} NMR (126 MHz, CDCl$_3$) δ 173.0, 136.6, 106.3, 83.9, 60.5, 24.9. $^{11}$B{$^1$H} NMR (160 MHz, CDCl$_3$): δ 28.7. M$^+$: 240.10 (calc.: 240.13).

Borylation of 2-methoxyfuran

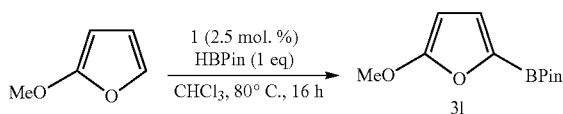

The general procedure was followed using 2-methoxyfuran (113 µL, 120 mg, 1.22 mmol) and HBPin (177 µL, 156 mg, 1.22 mmol). After 16 hours, a 74% conversion was measured by NMR and 170 mg (62%) of 2-(4,4,5,5-tetramethyl-1,3,2-dioxaborolan-2-yl)-5-methoxyfuran was obtained as a pale yellow oil. Although the product could be isolated and characterized, it was found to decompose overnight at room temperature in CDCl$_3$. The pure product can be kept for longer periods at low temperature in the dark.

$^1$H NMR (400 MHz, Chloroform-d) δ 7.00 (d, J=3.4, 1H), 5.22 (d, J=3.4, 1H), 3.87 (s, 3H), 1.32 (s, 12H). $^{13}$C{$^1$H} NMR (126 MHz, CDCl$_3$) δ 126.5, 110.1, 84.0, 81.5, 58.0, 24.9. $^{11}$B{$^1$H} NMR (160 MHz, CDCl$_3$): δ 26.9. M$^+$: 224.12 (calc.: 224.12).

Borylation of 2-methylfuran

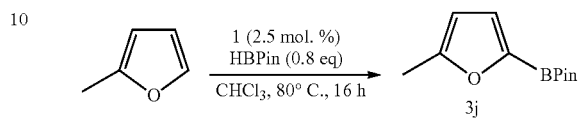

The general procedure was followed using 2-methylfuran (132 µL, 120 mg, 1.47 mmol) and HBPin (177 µL, 156 mg, 1.22 mmol). Complete conversion was measured by $^1$H NMR and 203 mg (80%) of 2-(4,4,5,5-tetramethyl-1,3,2-dioxaborolan-2-yl)-5-methylfuran was obtained as a pale yellow oil. NMR characterization was conform to that of the reported product.[40]

$^1$H NMR (500 MHz, Chloroform-d) δ 6.99 (dd, J=3.2, 0.6 Hz, 1H), 6.03 (dq, J=3.2, 0.9 Hz, 1H), 2.36-2.35 (br. s, 3H), 1.34 (s, 12H). $^{13}$C{$^1$H} NMR (101 MHz, CDCl$_3$) δ 157.9, 125.0, 107.0, 84.2, 24.9, 14.1. $^{11}$B{$^1$H} NMR (160 MHz, CDCl$_3$): δ 27.1. M$^+$: 208.11 (calc.: 208.13).

Borylation of 2-t-butylfuran

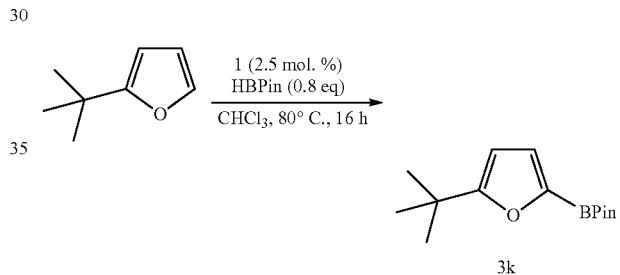

The general procedure was followed using 2-t-butylfuran (209 µL, 182 mg, 1.47 mmol) and HBPin (177 µL, 156 mg, 1.22 mmol). Complete conversion was measured by $^1$H NMR and 258 mg (86%) of 2-(4,4,5,5-tetramethyl-1,3,2-dioxaborolan-2-yl)-5-tertButylfuran was obtained as a pale yellow oil.

$^1$H NMR (400 MHz, Chloroform-d) δ 6.98 (d, J=3.3 Hz, 1H), 6.02 (d, J=3.3 Hz, 1H), 1.33 (s, 12H), 1.31 (s, 9H). $^{13}$C{$^1$H} NMR (101 MHz, CDCl$_3$) δ 169.9, 124.8, 103.3, 84.0, 77.2, 33.1, 29.3, 24.9. $^{11}$B{$^1$H} NMR (160 MHz, CDCl$_3$): δ 27.4.

General Procedure for the Metal-Free Catalytic Borylation of N-Methylpyrrole Using a Compound of Formula II

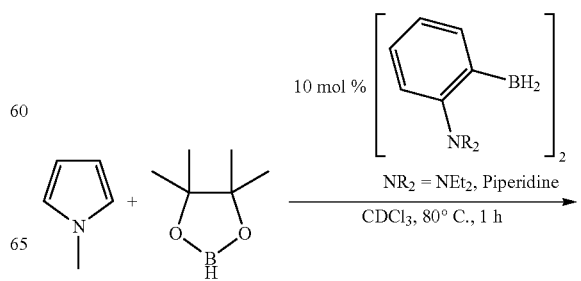

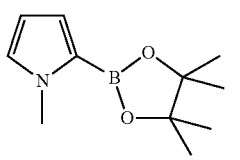

Quantitative conversion by 1HNMR

Stoichiometric Activation of Thiophene Using a Compound of Formula II

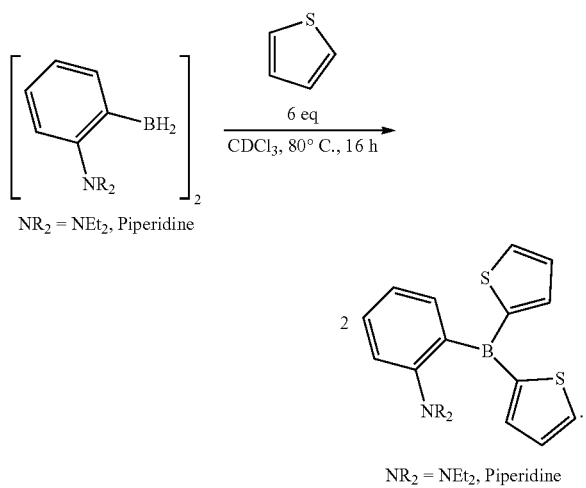

While the present disclosure has been described with reference to various embodiments in accordance with the present disclosure, it is to be understood that the disclosure is not limited to the disclosed examples. To the contrary, the disclosure is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety.

REFERENCES

1. O. Usluer, M. Abbas, et al. *ACS Macro Lett.* 3, 1134-1138 (2014).
2. A. de Meijere, F. Diedrich, Eds., *Metal-Catalyzed Cross-Coupling Reactions* (Wiley-VCH, Weinheim, ed. 2, 2004).
3. J. Wencel-Delord, F. Glorius, *Nature Chem.* 5, 369-375 (2013).
4. S. Rousseaux, B. Liégault, K. Fagnou, in *Modern Tools for the Synthesis of Complex Bioactive Molecules*, J. Cossy, S. Arseniyadis, Eds. (Wiley, Hoboken, 2012), chap. 1.
5. I. A. Mkhalid, J. H. Barnard, T. B. Marder, J. M. Murphy, J. F. Hartwig, *Chem. Rev.* 110, 890-931 (2010).
6. J.-Y. Cho, M. K. Tse, D. Holmes, R. E. Maleczka Jr., M. R. Smith, *Science* 295, 305-308 (2002).
7. T. Ishiyama et al., *J. Am. Chem. Soc.* 124, 390-391 (2002).
8. D. G. Hall, *Boronic Acids* (Wiley-VCH, Weinheim, ed. 2, 2011).
9. N. Miyaura, A. Suzuki, *Chem. Rev.* 95, 2457-2483 (1995).
10. T. J. Mazzacano, N. P. Mankad, *J. Am. Chem. Soc.* 135, 17258-17261 (2013).
11. T. Dombray, C. G. Werncke, et al., *J. Am. Chem. Soc.* 137, 4062-4065 (2015).
12. A. Del Grosso, P. J. Singleton, C. A. Muryn, M. J. Ingleson, *Angew. Chem., Int. Ed.* 50, 2102-2106 (2011).
13. A. Del Grosso, R. Pritchard, C. A. Muryn, M. J. Ingleson, *Organometallics* 29, 241-249 (2010).
14. M. A. Larsen, J. F. Hartwig, *J. Am. Chem. Soc.* 136, 4287-4299 (2014).
15. L. Ackermann, *Chem. Rev.* 111, 1315-1345 (2011).
16. M. Lafrance, K. Fagnou, *J. Am. Chem. Soc.* 128, 16496-16497 (2006).
17. G. C. Welch, R. R. S. Juan, J. D. Masuda, D. W. Stephan, *Science* 314, 1124-1126 (2006).
18. D. W. Stephan, G. Erker, *Angew. Chem., Int. Ed.* 49, 46-79 (2010).
19. D. W. Stephan, *Org. Biomol. Chem.* 10, 5740-5746 (2012).
20. M.-A. Courtemanche, M.-A. Légaré L. Maron, F.-G. Fontaine, *J. Am. Chem. Soc.* 135, 9326-9329 (2013).
21. O. Baslé, S. Porcel, S. Ladeira, G. Bouhadir, D. Bourissou, *Chem. Commun.* 48, 4495-4497 (2012).
22. K. Chernichenko et al., *Nature Chem.* 5, 718-723 (2013).
23. K. Chernichenko et al., *Angew. Chem., Int. Ed.* 54, 1749-1753 (2015).
24. S. I. Gorelsky, D. Lapointe, K. Fagnou, *J. Am. Chem. Soc.* 130, 10848-10849 (2008).
25. M. Gómez-Gallego, M. A. Sierra, *Chem. Rev.* 111, 4857-4963 (2011).
26. S. I Gorelsky, D. Lapointe, K. Fagnou, *J. Org. Chem.* 77, 658-668 (2012).
27. S. I. Gorelsky, *Coord. Chem. Rev.* 257, 153-164 (2013).
28. C. J. Smith, M. W. S. Tsang, A. B. Holmes, R. L. Danheiser, J. W. Tester, *Org. Biomol. Chem.* 3, 3767-3781 (2005).
29. C. Villarreal, R. Martinez, *Synthesis* 19, 3346-3352 (2010).
30. M. J. Frisch, G. W. Trucks, H. B. Schlegel, G. E. Scuseria, M. A. Robb, J. R. Cheeseman, G. Scalmani, V. Barone, B. Mennucci, G. A. Petersson, H. Nakatsuji, M. Caricato, X. Li, H. P. Hratchian, A. F. Izmaylov, J. Bloino, G. Zheng, J. L. Sonnenberg, M. Hada, M. Ehara, K. Toyota, R. Fukuda, J. Hasegawa, M. Ishida, T. Nakajima, Y. Honda, O. Kitao, H. Nakai, T. Vreven, J. A. Montgomery, Jr., J. E. Peralta, F. Ogliaro, M. Bearpark, J. J. Heyd, E. Brothers, K. N. Kudin, V. N. Staroverov, R. Kobayashi, J. Normand, K. Raghavachari, A. Rendell, J. C. Burant, S. S. Iyengar, J. Tomasi, M. Cossi, N. Rega, J. M. Millam, M. Klene, J. E. Knox, J. B. Cross, V. Bakken, C. Adamo, J. Jaramillo, R. Gomperts, R. E. Stratmann, O. Yazyev, A. J. Austin, R. Cammi, C. Pomelli, J. W. Ochterski, R. L. Martin, K. Morokuma, V. G. Zakrzewski, G. A. Voth, P. Salvador, J. J. Dannenberg, S. Dapprich, A. D. Daniels, O. Farkas, J. B. Foresman, J. V. Ortiz, J. Cioslowski, D. J. Fox, Gaussian 09, revision C.01; Gaussian, Inc.: Wallingford, C T, 2009.
31. J.-D. Chai, M. Head-Gordon, *Phys. Chem. Chem. Phys.* 10, 6615-6620 (2008).
32. S. Grimme, L. Goerigk, *Phys. Chem. Chem. Phys.,* 13, 6670-6688 (2011).
33. M. M. Francl, W. J. Pietro, W. J. Hehre, J. S. Binkley, M. S. Gordon, D. J. Defrees, J. A. Pople, *J. Chem. Phys.* 77, 3654-3665 (1982).
34. W. J. Hehre, R. Ditchfield, J. A. Pople, *J. Chem. Phys.* 56, 2257-2261 (1972).

35. A. V. Marenich, C. J. Cramer, D. G. Truhlar, *J. Phys. Chem. B* 113, 6378-6396 (2009).
36. S. Grimme, *J. Comp. Chem.* 27, 1787-1799 (2006).
37. K. Billingsley, S. L. Buchwald, *J. Am. Chem. Soc.* 129, 3358-3366 (2007).
38. A. Zulauf, M. Mellah, R. Guillot, E. Schulz, *Eur. J. Org. Chem.* 2008, 2118-2129 (2008).
39. L. Ji, R. M. Edkins, L. J. Sewell, A. Beeby, A. S. Batsanov, K. Fucke, M. Drafz, J. A. K. Howard, O. Moutounet, F. Ibersiene, A. Boucekkine, E. Furet, Z. Liu, J.-F. Halet, C. Katan, T. B. Marder, *Chem. Eur. J.* 20, 13618-13635 (2014).
40. T. Hatanaka, Y. Ohki, K. Tatsumi, *Chem. Asian. J.* 5, 1657-1666 (2010)

The invention claimed is:

1. A catalytic process for the functionalization of a sp$^2$ carbon, the process comprising:
   contacting a compound of Formula I:

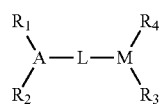

wherein:
   A is N;
   M is B;
   $R_1$ and $R_2$ are independently hydrogen, $C_{1-15}$alkyl, $C_{4-15}$branched alkyl, $C_{6-18}$aryl, $C_{6-18}$aryl having at least one $C_{10}$ alkyl substituent, $C_{5-8}$cycloalkyl; $C_{5-8}$cycloalkyl having at least one $C_{1-10}$ alkyl substituent; or
   $R_1$ and $R_2$ are linked together to form a nitrogen containing ring system, wherein the nitrogen containing ring system may further comprise at least one heteroatom selected from nitrogen, oxygen and sulfur, and wherein the nitrogen containing ring system is optionally substituted by one or more $C_{1-10}$ alkyl groups;
   $R_3$ and $R_4$ are independently hydrogen, halogen, $C_{1-15}$ alkyl, $C_{4-15}$branched alkyl, $C_{6-18}$aryl, $C_{6-18}$aryl having at least one substituent chosen from halogen and $C_{1-10}$ alkyl, $C_{5-8}$cycloalkyl;
   $C_{5-8}$cycloalkyl having at least one $C_{1-10}$ alkyl substituent, OR$_6$; or
   $R_3$ and $R_4$ are linked together to form a boron containing ring system, wherein the boron containing ring system may further comprise at least one heteroatom selected from nitrogen, oxygen and sulfur, and wherein the boron containing ring system is optionally substituted by one or more $C_{1-10}$ alkyl groups;
   $R_5$ is hydrogen, $C_{1-15}$ alkyl, OR$_6$, and halogen;
   $R_6$ is $C_{1-15}$ alkyl;
   L is a heteroarene, arene, or a carbon chain ($C_1$ trough $C_{20}$) which can be linear, cyclic or branched and may comprise heteroatoms, with the proviso that A and M are in a vicinal position relative to each other; or
   L is a polymer comprising monomeric repeating units having an aryl group, with the proviso that A and M are in a vicinal position relative to each other on the aryl groups;
   a functionalization reagent; and
   a substrate comprising a sp$^2$-H carbon;
   under conditions to provide a substrate comprising a functionalized sp$^2$ carbon; wherein the functionalization reagent is an organoborane reagent.

2. The catalytic process of claim 1, wherein A is N, M is B and L is $C_6$ aryl.

3. The catalytic process of claim 1, wherein the substrate is an alkene, an arene or a heteroarene.

4. The catalytic process of claim 1, wherein the substrate is N-methylpyrrole, N-benzylpyrrole, 1-(trimethylsilyl)pyrrole, 1-(triisopropylsilyl)pyrrole, 1-methylindole, 3,4-ethylenedioxythiophene, 2-methoxythiophene, furan, 2-methylfuran, 2-t-butylfuran, 2-methoxyfuran, 2-trimethylsiloxyfuran, 3-bromofuran, 2-bromofuran and thiophene.

5. The catalytic process of claim 1, wherein the organoborane reagent is chosen from HBPin, HBCat and 9BBN.

6. The catalytic process of claim 1, further characterized by the absence of metal based or organometallic reagents.

7. The catalytic process of claim 1, further characterized by heating in a suitable solvent at temperatures ranging from 60 to 120° C.

8. The catalytic process of claim 1, wherein the compound of Formula I is present from about 1 mol % to about 10 mol %.

9. A catalytic process for the dehydrogenative functionalization of a sp$^2$ carbon, the process comprising:
   contacting a compound of Formula I:

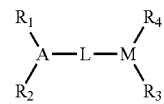

wherein:
   A is N;
   M is B;
   $R_1$ and $R_2$ are independently hydrogen, $C_{1-15}$ alkyl, $C_{4-15}$branched alkyl, $C_{6-18}$aryl, $C_{6-18}$aryl having at least one $C_{1-10}$ alkyl substituent, $C_{5-8}$cycloalkyl; $C_{5-8}$cycloalkyl having at least one $C_{1-10}$ alkyl substituent; or
   $R_1$ and $R_2$ are linked together to form a nitrogen containing ring system, wherein the nitrogen containing ring system may further comprise at least one heteroatom selected from nitrogen, oxygen and sulfur, and wherein the nitrogen containing ring system is optionally substituted by one or more $C_{1-10}$ alkyl groups;
   $R_3$ and $R_4$ are independently hydrogen, halogen, $C_{1-15}$ alkyl, $C_{4-15}$branched alkyl, $C_{6-18}$aryl, $C_{6-18}$aryl having at least one substituent chosen from halogen and $C_{1-10}$ alkyl, $C_{5-8}$cycloalkyl;
   $C_{5-8}$cycloalkyl having at least one $C_{1-10}$ alkyl substituent, OR$_6$; or
   $R_3$ and $R_4$ are linked together to form a boron containing ring system, wherein the boron containing ring system may further comprise at least one heteroatom selected from nitrogen, oxygen and sulfur, and wherein the boron containing ring system is optionally substituted by one or more $C_{1-10}$ alkyl groups;
   $R_5$ is hydrogen, $C_{1-15}$ alkyl, OR$_6$, and halogen;
   $R_6$ is $C_{1-15}$ alkyl;
   L is a heteroarene, arene, or a carbon chain ($C_1$ trough $C_{20}$) which can be linear, cyclic or branched and may comprise heteroatoms, with the proviso that A and M are in a vicinal position relative to each other; or L is a polymer comprising monomeric repeating units having an aryl group, with the proviso that A and M are in a vicinal position relative to each other on the aryl groups;
a functionalization reagent; and
a substrate comprising a sp²-H carbon;
under conditions to provide a substrate comprising a functionalized sp² carbon; wherein the functionalization reagent is an organoborane reagent.

10. The catalytic process of claim 9, wherein A is N, M is B and L is $C_6$ aryl.

11. The catalytic process of claim 9, wherein the substrate is an alkene, an arene or a heteroarene.

12. The catalytic process of claim 9, wherein the substrate is N-methylpyrrole, N-benzylpyrrole, 1-(trimethylsilyl)pyrrole, 1-(triisopropylsilyl)pyrrole, 1-methylindole, 3,4-ethylenedioxythiophene, 2-methoxythiophene, furan, 2-methylfuran, 2-t-butylfuran, 2-methoxyfuran, 2-trimethylsiloxyfuran, 3-bromofuran, 2-bromofuran and thiophene.

13. The catalytic process of claim 9, wherein the organoborane reagent is HBPin, HBCat or 9BBN.

14. The catalytic process of claim 9, further characterized by the absence of metal based or organometallic reagents.

15. The catalytic process of claim 9, further characterized by heating in a suitable solvent at temperatures ranging from 60 to 120° C.

16. The catalytic process of claim 9, wherein the compound of Formula I is present from about 1 mol % to about 10 mol %.

17. The catalytic process of claim 1, wherein the compound of Formula I is:

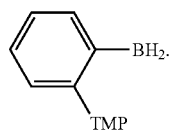

18. The catalytic process of claim 9, wherein the compound of Formula I is:

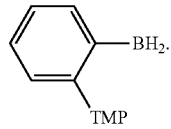

* * * * *